United States Patent [19]

Hamano et al.

[11] Patent Number: 4,763,163
[45] Date of Patent: Aug. 9, 1988

[54] ELECTROSTATIC PHOTOCOPIERS

[75] Inventors: Hiroaki Hamano, Toyohash; Hiroyuki Hanamoto; Masazumi Ito, both of Toyokawa all of Japan

[73] Assignee: Minolta Camera Kabushiki Kaisha, Osaka, Japan

[21] Appl. No.: 48,901

[22] Filed: May 12, 1987

Related U.S. Application Data

[63] Continuation of Ser. No. 879,995, Jun. 30, 1986, abandoned.

[30] Foreign Application Priority Data

| Jul. 3, 1985 | [JP] | Japan | 60-147542 |
| Jul. 7, 1985 | [JP] | Japan | 60-153112 |
| Jul. 9, 1985 | [JP] | Japan | 60-153111 |

[51] Int. Cl.$^4$ .................................. G03G 15/00
[52] U.S. Cl. ........................... 355/14 SH; 355/8; 355/7
[58] Field of Search .............. 355/14 R, 14 SH, 8, 355/3 R, 3 SH, 7

[56] References Cited

U.S. PATENT DOCUMENTS

| 4,017,173 | 4/1977 | Komori et al. | 355/8 |
| 4,264,188 | 4/1981 | Tomosada et al. | 355/14 |
| 4,563,079 | 1/1986 | Inuzuka et al. | 355/8 |
| 4,615,610 | 10/1986 | Yoshiura | 355/8 X |

Primary Examiner—R. L. Moses
Attorney, Agent, or Firm—Price, Gess & Ubell

[57] ABSTRACT

An improved electrostatic photo-copying machine is proposed. In this improved photo-copier, an optical system for scanning a document from which photocopies are to be made is provided. However, the movable range of the optical system is divided into a front half and a rear half, adapted for execution of successive scannings so as to provide a book copy mode operation. If, however, an incompatible operation to the book copy mode, for instance, manual feed of any suitable size copy paper through a manual feed opening; automatic document feed mode or the like has been specified, the once and in advance selected-out book copy mode is automatically released from service.

14 Claims, 38 Drawing Sheets

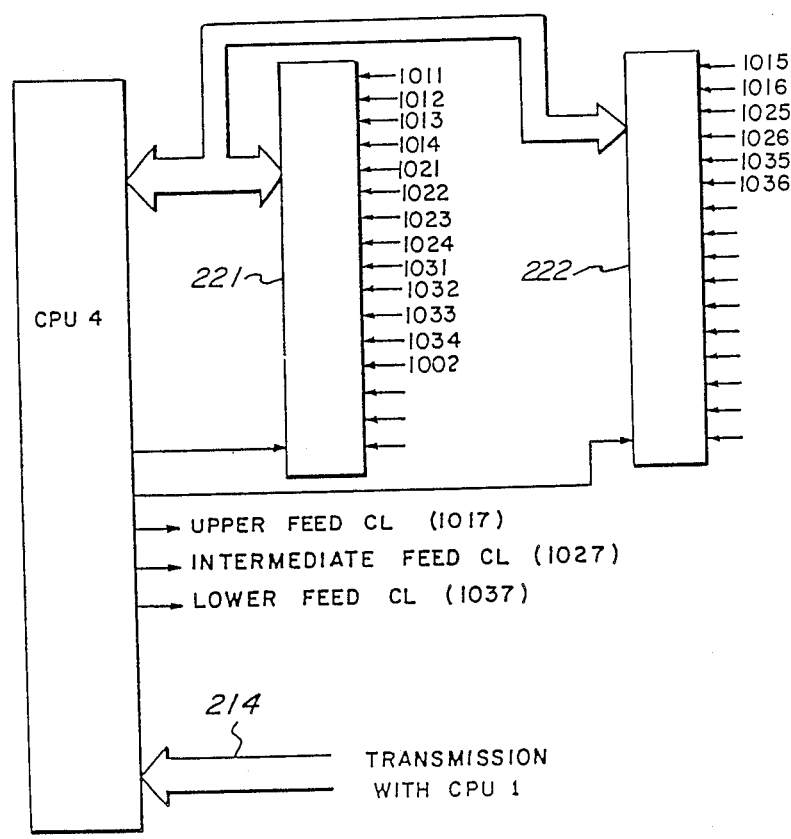

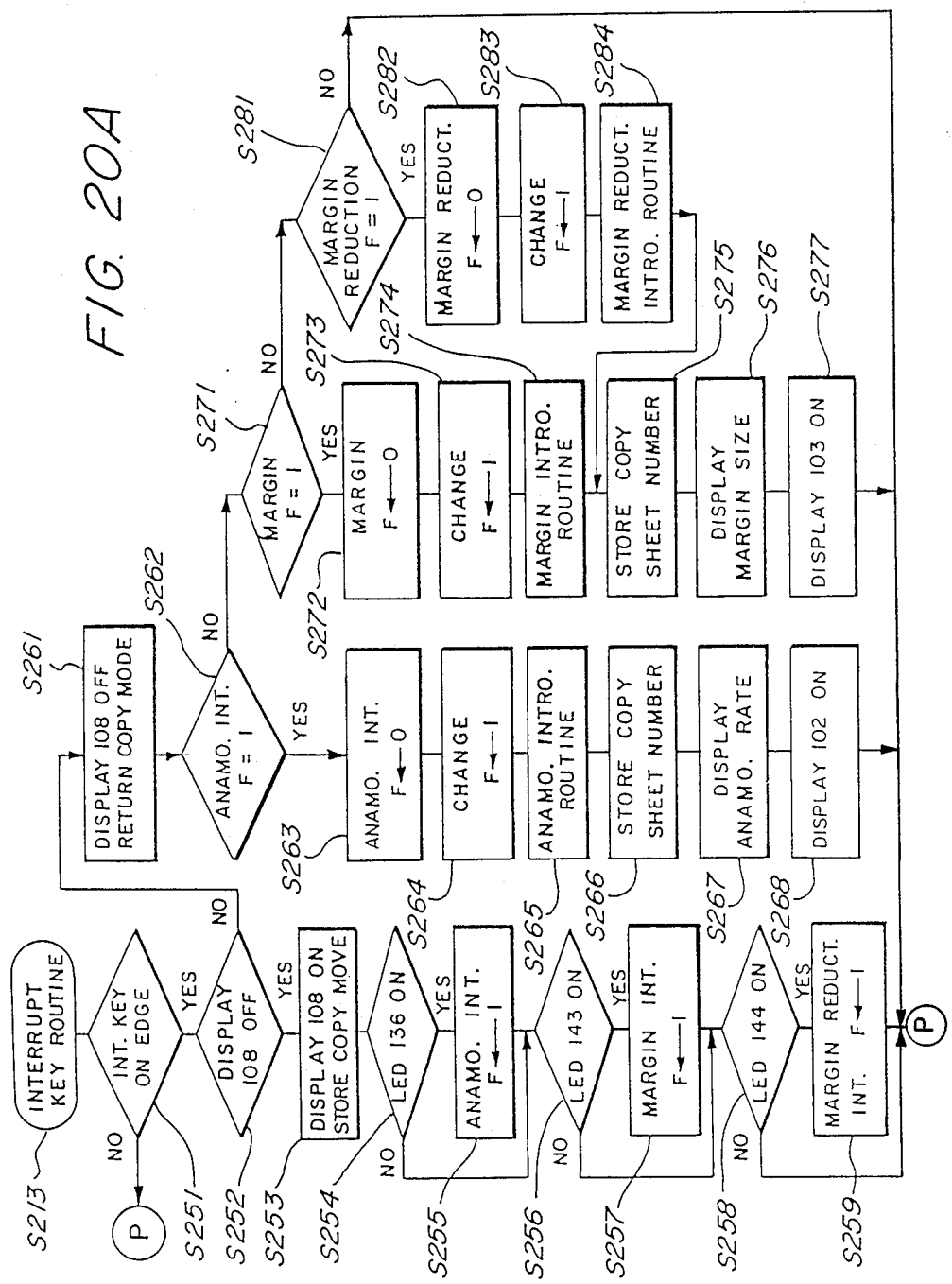

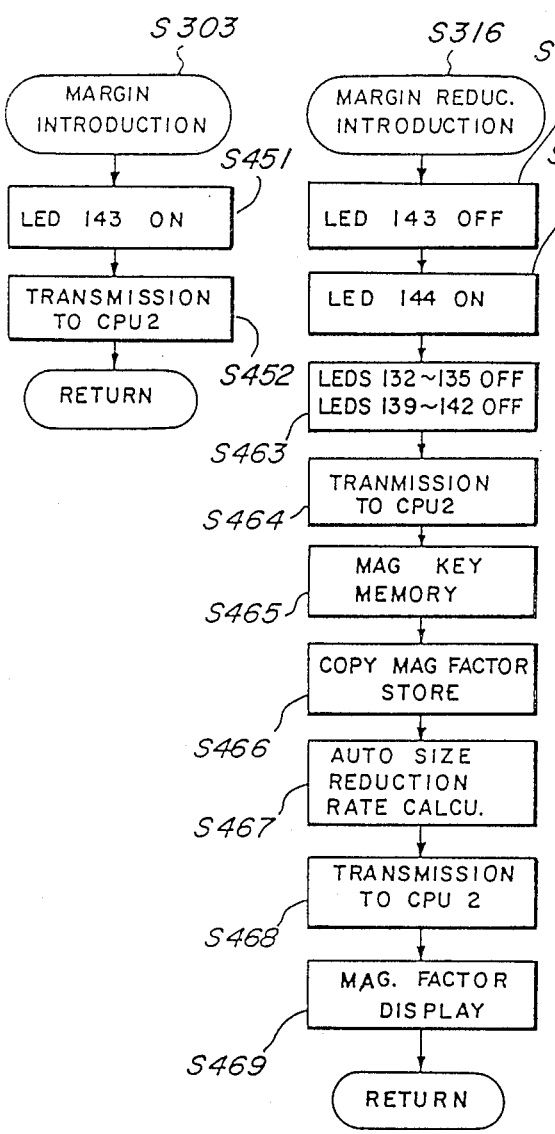

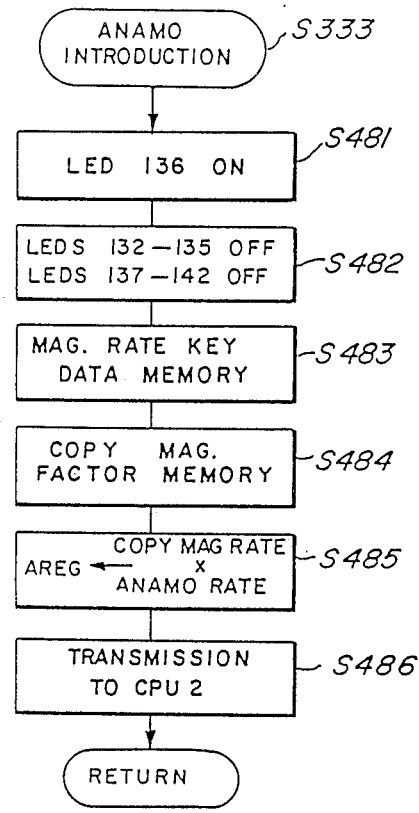
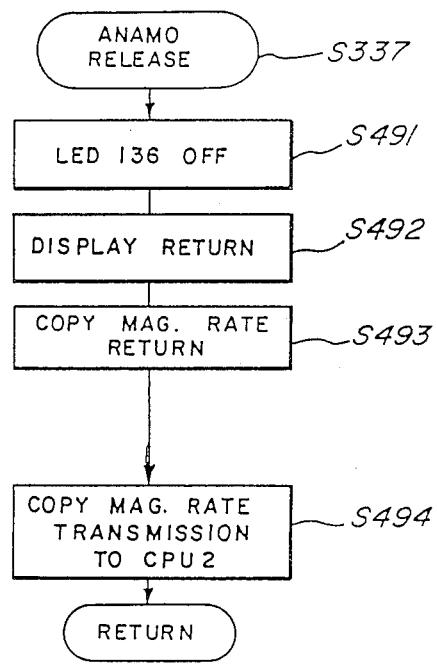
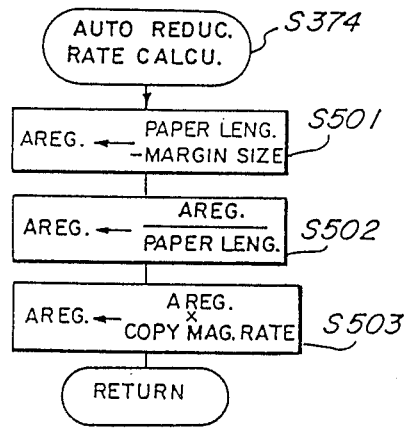
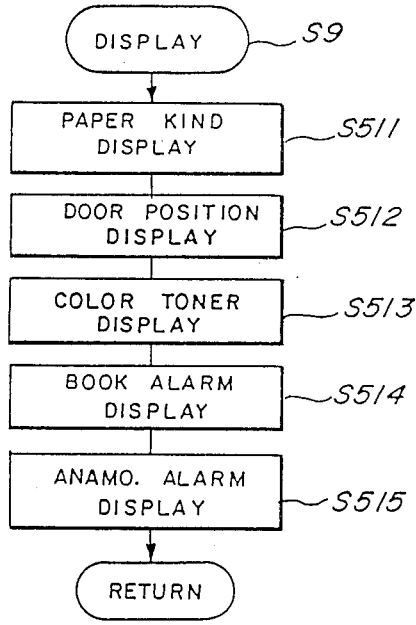

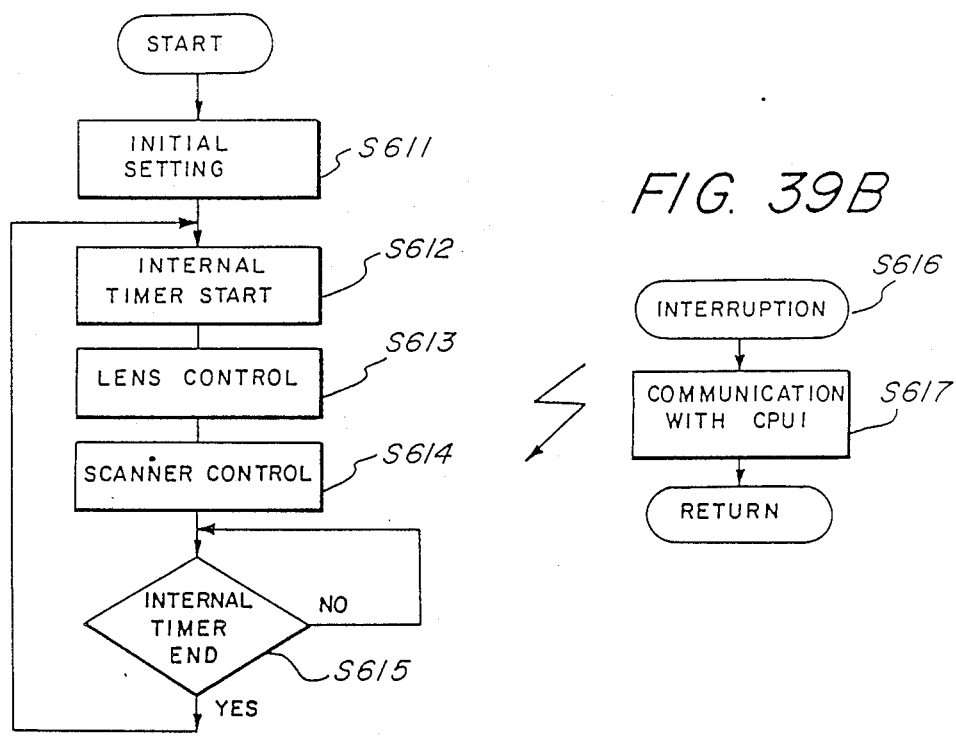
FIG. 39A
FIG. 39B
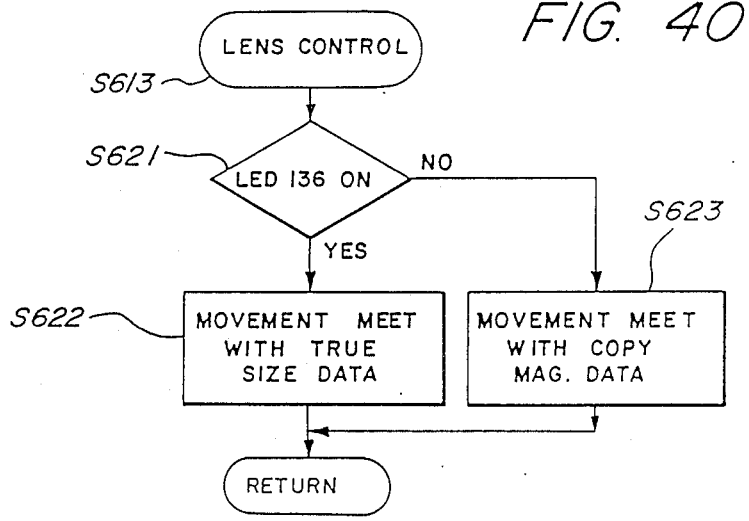
FIG. 40

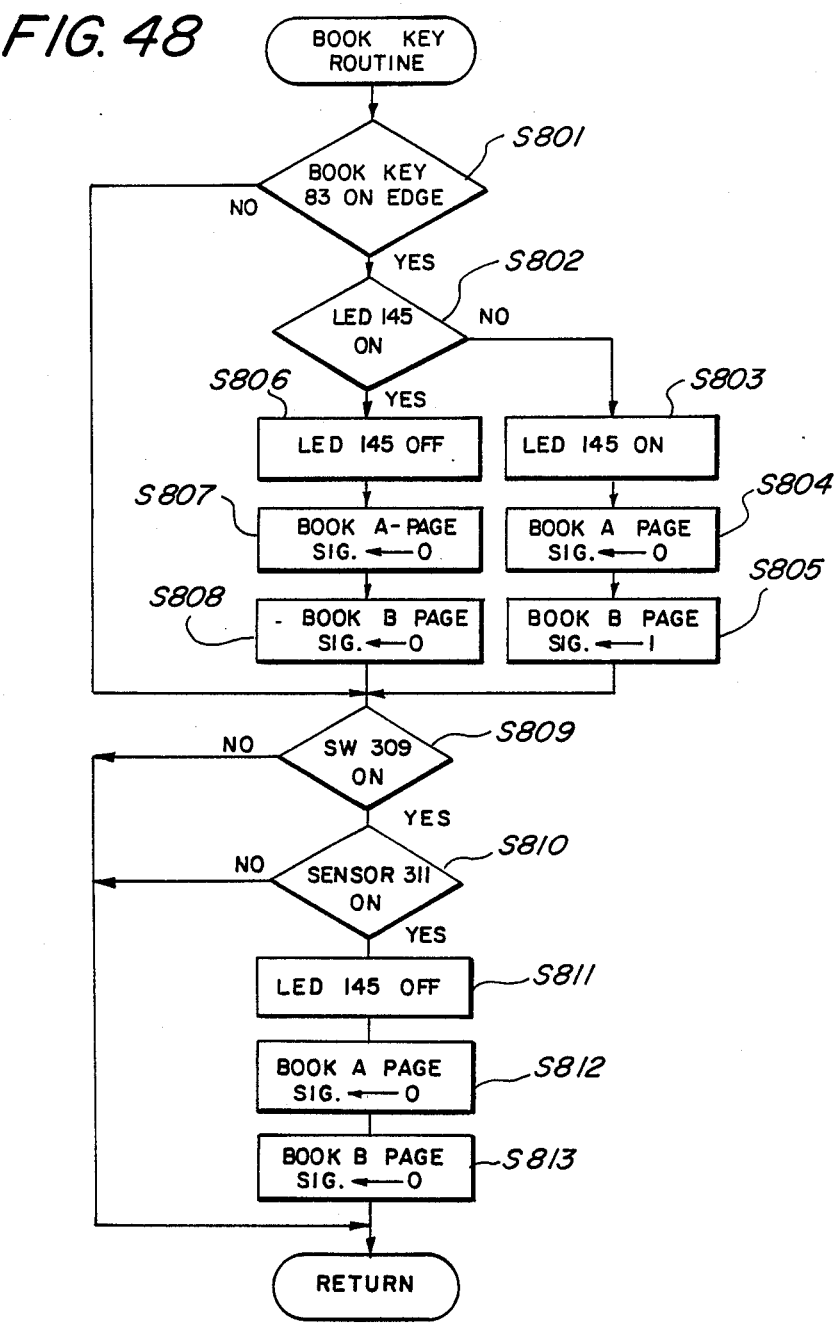

ELECTROSTATIC PHOTOCOPIERS

This is a continuation of application Ser. No. 879,995, filed June 30, 1986, now abandoned.

BACKGROUND OF THE INVENTION

1. Fields of the Invention

The invention concerns with improvements in and relating to electrostatic photocopiers capable of operating in the book copy mode and fitted automatic document feeder means and further occasionally with manual paper feeder means.

2. Prior Art

It is well known to those skilled in the art that electrostatic photocopiers may well be fitted with such means which makes the copier functionable in the book copy mode as so called. With such modernized photocopier, an opened book used as the original document of which copies must be prepared is placed on a transparent plate constituting part of the top of the housing of the photocopier proper. When the operator actuates a print button of the machine, the optical system thereof is caused to scan these two open pages of the book successively for the execution of copying jobs on two separate paper sheets.

Therefore, it is unnecessary in this case, to manipulate the copy button for each page of the book, and thus, two successive book pages can be photocopied on respective copying sheets upon only one manipulation of the copy button.

In the case of the book copy mode operative electrophotostatic copiers, it is also known to control the scanning area depending upon the lengthwise dimension of the copying paper sheet (more specifically, the longer size dimension of paper sizes of the format such as A4, B4 or the like reference may be had to FIG. 10 and its related disclosure to follow). In the case of this system, and corresponding to a single manipulation of the copy button, a first page and the following page of an open document book are successively scanned by the optical system of the machine for the execution of the following successive electrostatic photocopying.

On the other hand, the electrostatic photocopier may be provided with a feed opening adapted for receiving copying paper sheets in the manual feed mode. With such an arrangement, any selected size paper is utilized for photocopying.

It is now assumed that when a copying paper is introduced and supplied through such manual paper supply opening, the practically used paper dimension as measured in its lengthwise direction cannot be estimated beforehand. Thus, in this case, the necessary operation control of the book copy mode machine cannot be realized.

On the other hand, electrostatic photocopiers may rather frequently be fitted with respective automatic document feeders, briefly called "ADF". With this improved document feeder, a number of documents to be copied are automatically and successively fed onto the conventional transparent plate. In this case, manual and independent sheetwise positioning of documents can be dispensed with, thus otherwise consuming too much time and labor can be saved to a substantial degree.

However, it should be noted that in this kind of a rather modernized electrostatic photo-copier which is capable of performing a book copy mode photo-copying operation and additionally fitted with ADF-means, if the user should adopt a simultaneous and combined operation of the book copy mode and of the automatic document feed mode, miscopies may be defectively produced. More specifically, in case of the book mode operation, twice scanning operations will be carried out by the optical scanning system for each one photocopying operation. In the first scanning operation, the document brought onto the transparent plate or the machine proper by the action of the ADF-mechanism, can be copied in the normal and regular way. Upon the completion of the said first scanning operation, the ADF-mechanism adjudges, indeed, that the copying operation has been successfully completed, and the document will be carried away outside of the ADF-mechanism. Thus, there is no document in position when the next succeeding, second scanning operation is caused to initiate. Therefore, in the second scanning operation, the copy paper cannot have any document image. And instead, the copy paper has, indeed, copied images of the ADF-conveyor belt means per se.

SUMMARY OF THE INVENTION

A main object of the present invention is to provide an improved electrostatic photocopying machine capable of inhibiting the co-existence of two incompatible copying modes.

Another object is to provide an improved electrostatic photocopying machine operable in the book copy mode and fitted with an automatic document feeder means, wherein, however, an operative coexistence of these two functions is positively prevented.

It is a further object of the present invention to provide an improved electrostatic photo-copying machine, in which means for inhibiting the operative coexistence of a book copy mode wherein the document scan range is controlled depending upon the length of the copying paper, with a paper feed mechanism adapted for advance notice of copy paper size.

The improved electrostatic photo-copying machine according to this invention adapted for fulfilment of the foregoing objects, comprises:

means for specifying a copying operation in a book copy mode;

means for executing a book copying operation by successive scannings with use of an optical system the movable range thereof being divided into a front half and a rear half and when said specifying means specify the execution of said book copy mode copying operation;

manual copy paper supply means adapted for feeding manually and the desired size of copy paper;

means for sensing the manual copy mode when the latter has been specified;

means for automatic carrying of an introduced document onto a transparent plate adapted for positioning said document thereon in service;

means for sensing the operable condition of said foregoing automatic document feeder means; and book copy control means for a release book copy mode specifying made by and specifying means when either manual copy paper supply means or automatic document carrier means has been selected out.

BRIEF DESCRIPTION OF DRAWINGS

FIG. 7 is a circuitry for showing inputs and outputs, respectively, to and from a microprocessor, or briefly fourth controller CPU4 adapted for control of a three-stage paper feed unit.

FIGS. 20A and 20B are flow chart of a sub-routine for execution of the interruption key processing.

FIG. 27 is a flow chart of a sub-routine for execution of the margin introduction processing.

FIG. 28 is a flow chart of a sub-routine for execution of the margin reduction introduction processing.

FIG. 29 is a flow chart of a sub-routine for execution of the margin release processing.

FIG. 30 is a flow chart of a sub-routine for execution of the anamo-introduction processing.

FIG. 31 is a flow chart of a sub-routine for execution of the anamo-release processing.

FIG. 32 is a flow chart of a sub-routine for execution of the automatic reduction rate calculation processing.

FIG. 33 is a flow chart of a sub-routine for execution of the display processing.

FIGS. 38(A) and (B) illustrate jointly a flow chart of the main routine of a program for a microprocessor CPU2 adapted for control of an optical system embodied in the inventive photo-copier.

FIG. 40 is a flow chart of a sub-routine for execution of the lens control as employed.

FIG. 48 is a flow chart of a sub-routine for the illustration of the a modified embodiment of the invention.

PREFERRED EMBODIMENTS

Now, referring to the accompanying drawings, a preferred embodiment of the present invention will be described in detail.

The description will be set forth successively in the following schedule.

(a) Main Structure of the copier machine
(b) Operation panel
(c) Detail arrangement of the copier proper control section
(d) Special purpose copy modes (margin copy mode; anamo-copy mode and book copy mode)
(e) Operation of the copier proper
   e-1: Main routine
   e-2: Manual paper insertion door opening manipulation e-3: Cassette insertion process
   e-4: Copying operation
   e-5: Automatic paper selection process
   e-6: Automatic magnification ratio selection process
   e-7: Key manipulation modes
      e-7-1: Magnification-up key manipulations
      e-7-2: Magnification-down key manipulations
      e-7-3: Interruption key operations
      e-7-4: Margin copy mode selection key manipulations e-7-5: Anamofic copy mode selection key manipulations
e-7-6: Cassette selection key manipulations
e-7-7: Book copy mode selection key manipulations
e-7-8: Automatic exposure key manipulations
e-7-9: Margin-introduction, margin-formation and margin-release sub-routines
e-7-10: Sub-routines for anamo-introduction and anamofic release manipulations
e-7-11: Automatic reduction ratio calculation procedures
e-8: Display manipulations
e-8-1: Paper kind display
e-8-2: Door position display
e-8-3: Color toner display
e-8-4: Book alarm display
e-8-5: Anamofic alarm display
(f) Operations of the optical system
(g) ADF-operations.

Figure 25:
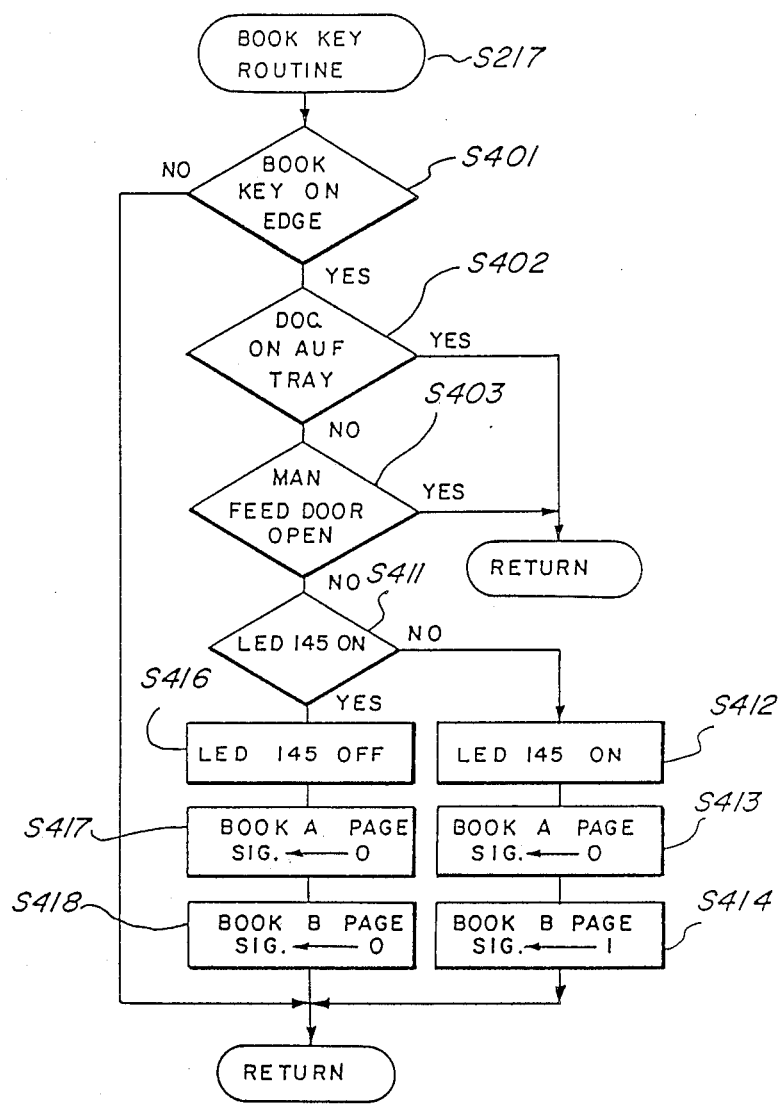
FIG. 25 is a flow chart of a sub-routine for execution of the book copy mode selection key processing.

It should be mentioned at this stage that those embodiment parts which relate most stressingly to the gist of the invention will be set forth in items (a)–(d); e-2 (relating to FIG. 12); e-4 (relating to FIG. 14) and e-7-7 (relating to FIG. 25).

Further to be noted is that the term "margin" herein used throughout the specification and appended claims denotes more specifically "file margin".

Moreover, the term "anamofic copy", "anamofic release" and the like are hereinbelow abbreviated to "anamo-copy", "anamo-release", and the like.

PREFERRED EMBODIMENTS OF THE INVENTION

In the following, preferred embodiments of the inventive electrostatic photo-copier will be described in detail with reference to the accompanying drawings.

(a) Main Structure of the copier machine

Figure 1:
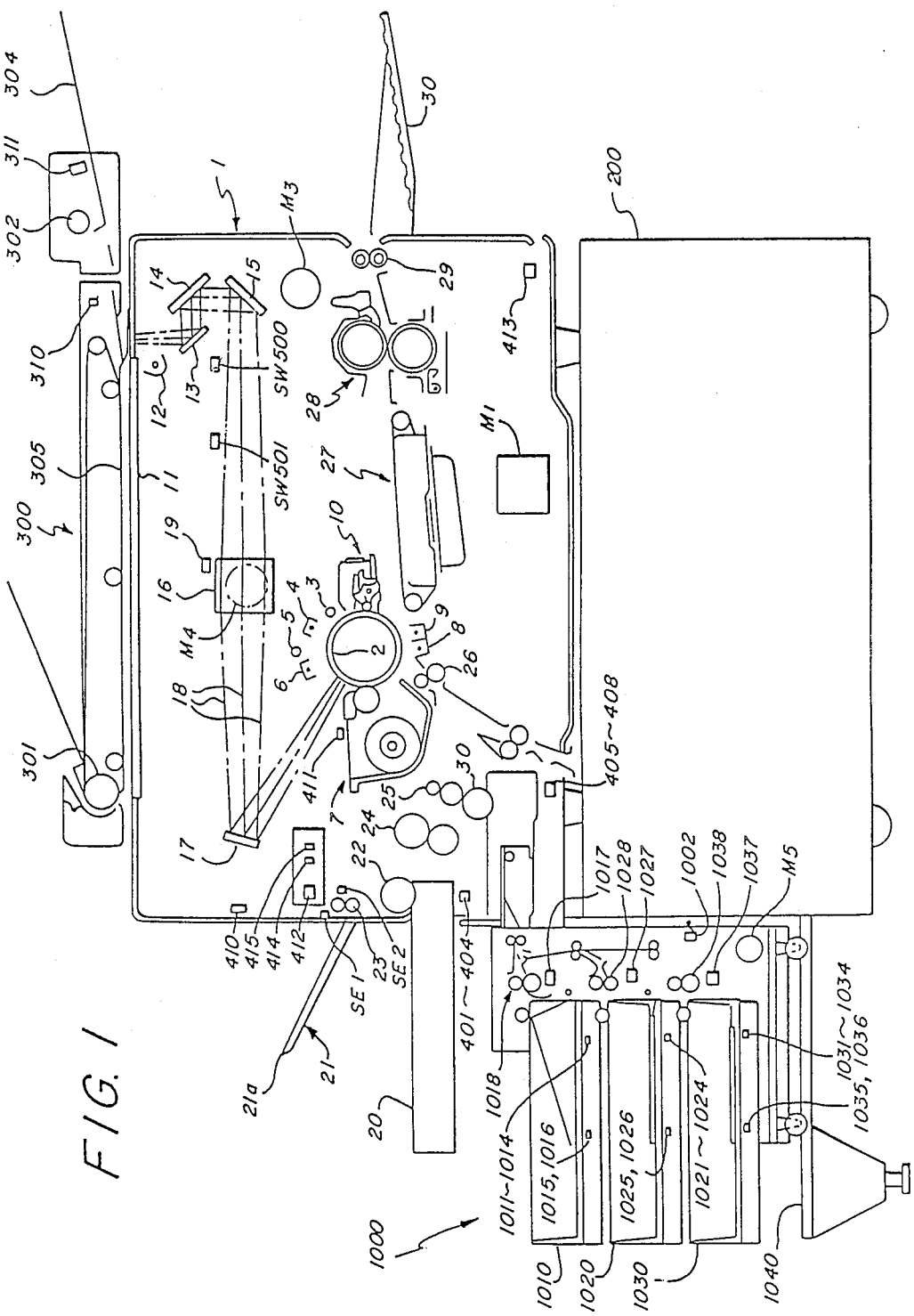
FIG. 1 is a sectional view of an electrostatic photocopying machine as a preferred embodiment of the invention.

Referring now to FIG. 1, showing the machine in its schematic vertical section, numeral 1 denotes a copier machine proper, which is mounted on a movable base 200 formed preferably in a hollow box as shown.

Numeral 300 represents an automatic document feeder, abbreviated normally as ADF, and attached preferably optionally. Numeral 1000 represents a paper feeder assembly comprising three stage feeder units stacked vertically and attached to the machine proper 1.

Although the general arrangement and mutual operation of the constituents of the copier proper 1 employed herein are substantially known, these will be described substantially in detail hereinbelow for better understanding of the objects and nature of the present invention.

Nearly at the center of the copier proper 1, there is a photosensitive drum 2 which is rotatable in the counter clockwise direction in FIG. 1, although the drive mechanism thereof is not shown and described for its very popularity.

Around the drum 2 and at small distances therefrom, there are provided several necessary and conventional attachments, such as a main eraser lamp 3; a sub-electrostatic charger 4; a sub-eraser lamp 5; a main electrostatic charger 6; a developer unit 7; a transfer charger 8; a transfer paper separation charger 9; and a blade type cleaner unit 10 in succession as shown.

The drum 2 is provided with a conventional photosensitive layer on its cylindrical surface as, which is subjected in each photocopying operation of the machine to an illumination with lights from the eraser lamps 3; 5, to an electrostatical charging by-passing cooperation with the chargers 4; 6, and to an image exposure by and from the optical system to be described hereinafter.

Only symobolically, M1 represents an electric main motor adapted for driving the drum 2 and the like. However, necessary transmission gearing and the like have been omitted from the drawing by virtue of its very popularity. In close proximity of the developer unit 7, a conventional color toner sensor 411 is provided slightly above the former, as only schematically shown.

The optical system is arranged directly below a transparent plate 11 for placing the document, not shown, and constituting part of the ceiling of the machine housing 1, representing the machine proper, the said system comprising a light source 12; a first mirror 14; a second mirror 14; a third mirror 15; a projector lens 16; and a fourth mirror 17.

As being schematically shown with three substantially parallel lines 18, any true images carried on the document are projected optically by successively passing through the optical elements 13–17 onto the photosensitive drum 2.

SW500 denotes a sensor switch which is provided to sense the optical system if the latter is positioned at its predetermined position or not during a execution of its scanning service.

An automatic exposure sensor 19 is provided above and in close proximity of the projecting lens 16 for measuring the intensity of the reflected light beams from the reflecting mirror 15 so as to determine the image density of the document.

The magnification factor or rate is set by modifying or moving the position of the projecting lens 16 to-and-fro along the optical axis by energizing a drive motor M4 provided for this purpose, as is commonly known.

There is another drive motor M3 for the execution of the desired scanning service of said optical system as usual.

With the magnification factor selected to "n" and the surface speed of the drum being a constant, "v" (meter/sec) irrespective of either true or varied size copying mode, light source 12 and first mirror 13 are caused to move to the left in FIG. 1 at a speed of v/n under the action of motor M3. At the same time, second mirror 14 and the third mirror 15 will be moved at a speed of v/2n, again to the left in FIG. 1. With these movements, the image will be optically projected through the last mirror 17 onto the drum 2 and, indeed, in the form of slits.

Copier proper 1 is fitted at its lefthand side thereof in FIG. 1, an automatic paper feed cassette 20 is positioned at the level of the middle height supply opening, a three stage- or three unit mode paper feeder 1000 at the level of a lower supply opening and finally, a manual paper feeder 21 at the level of an upper height supply opening. The said three unit mode feeder 1000 is attached optionally and in place of a second automatic paper feeder to be normally provided at the same supply opening.

Copyable paper, fed from within cassette 20 or manual feeder 21, is delivered selectively through a feed roller pair 22 or 23 and further through 24 or 25 till to a timing roller pair 26 for awaiting thereat for a certain short time period. Another paper feed roller pair 30 is provided for feeding paper through the lower supply opening.

In the transfer service period, the paper is caused to stick tightly onto the drum surface at 2 in the transfer section of the machine and a toner image is transferred from the drum by corona discharge at the transfer charger 8 and then subjected to separation from the drum surface under the influence of a further corona discharge at separation charger 9 and assisted by paper stiffness itself. Then, the thus copied paper will be sucked onto a conveyor belt 27 fitted with conventional suction means, not shown. With clockwise rotation of this conveyor belt, the copied paper is conveyed by the conveyor righthandwards in FIG. 1, until it arrives at a fusing unit 28 provided for the execution of a conventional toner image fusing deposition job. Then, the photo copied paper will be discharged via a discharge roller pair 29 to an outside tray 30 or a conventional sorting unit, not shown, or the like reception means.

There are two microswitch groups 401–404 and 405–408 within the copier proper 1 and in close proximity of the upper and lower paper supply openings, serving for paper size sensing jobs. In addition, these microswitch groups are adapted for sensing the occasional positioning, lateral or longitudinal, of the copying papers relative to the paper traveling direction.

Copyable paper sizes or paper sizes fittable to the said paper supply feeders are, as an example, A3; A4; A5; B4 and B5. As for the paper formats A4 and B5, the papers may be set in position longitudinally or laterally, as the case may be.

It should be noted that the switch groups 401–404; 405–408 are arranged additionally to sense attachment or detachment of the respective paper feed cassettes, thus serving for sensing indirectly the existence or nonexistence of copyable papers in position at and near-by the paper feed openings.

The paper size and the paper-setting direction are sensed by the microswitches 401–404; and 405–408 and expressed by the ON/OFF combination thereof and coded in 4-bits. This coded paper information is stored in RAM 213 of the first controller CPU1 contained in a control circuit shown in FIG. 4.

A code table using microswitches 401–404 will be shown in the "Table" to be set forth herein. In this table, the switch-on state is represented by "0", while the switch-off state is shown with "1". As an example, if all these microswitches 401–404 are off, it is shown that cassette 20 has not yet been fitted in position at its attributed paper feeder. This fact means indirectly that there is no copy paper in position now considering.

A plurality of sensors are provided on the copier proper 1, of which, switch 410 provided as the manual paper introduction sensor may first be referred to. This switch 410 serves for sensing the closure or opening of a manual paper insertion door 21a consituting the manual paper feed-in section 21 for the copier proper. During off-service period, this door 21a is kept closed.

Sensors SE1 and SE2 are provided for sensing of a copy paper if the latter is seen at the said feed-in section.

Figure 2A:
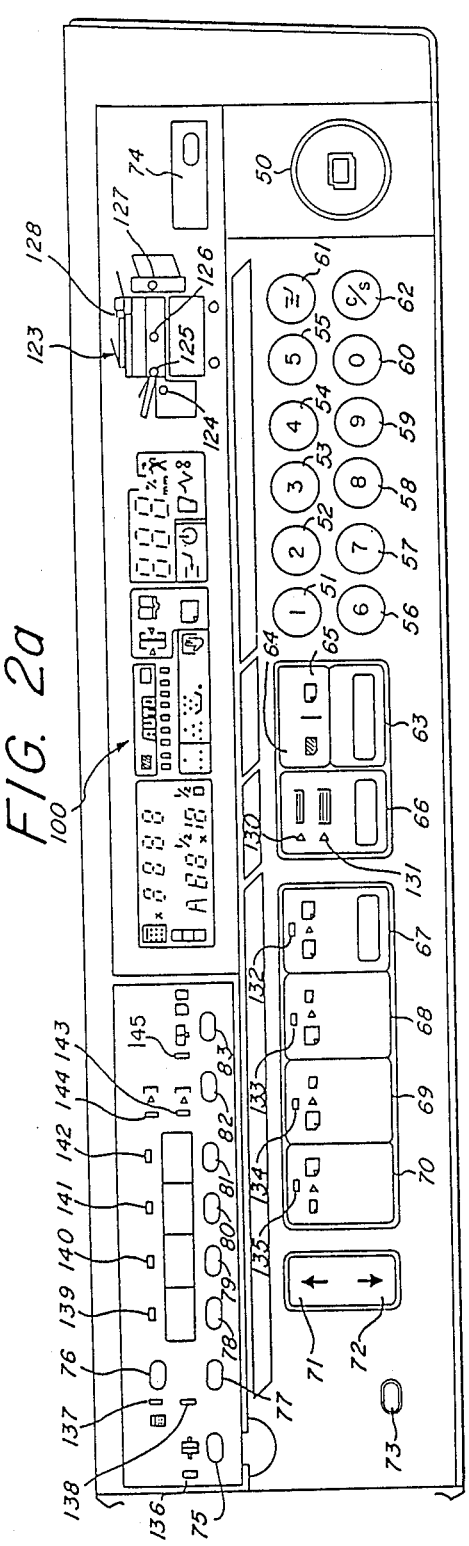
FIG. 2(a) and FIG. 2(b) represent respectively, a plan view and a front view of a manipulation panel of the inventive photo-copying machine.

Change-over switch 412 is provided for changing the display mode at S1, S2 and S3, shown generally with reference numeral 121 in FIG. 2, of which more detailed description will be set forth later hereinafter.

Switch 413 serves for sensing opening/closure of the front door, not shown, of the copier proper.

TABLE

| Binal Code | | | | Size of Copy | Decimal |
|---|---|---|---|---|---|
| SW4 | SW3 | SW2 | SW1 | Paper | Code |
| 0 | 0 | 0 | 0 | | 0 |
| 0 | 0 | 0 | 1 | | 1 |
| 0 | 0 | 1 | 0 | | 2 |
| 0 | 0 | 1 | 1 | A5 longitudinal | 3 |
| 0 | 1 | 0 | 0 | B5 longitudinal | 4 |
| 0 | 1 | 0 | 1 | A4 longitudinal | 5 |
| 0 | 1 | 1 | 0 | B4 longitudinal | 6 |
| 0 | 1 | 1 | 1 | A3 longitudinal | 7 |
| 1 | 0 | 0 | 0 | | 8 |
| 1 | 0 | 0 | 1 | | 9 |
| 1 | 0 | 1 | 0 | B5 lateral | 10 |
| 1 | 0 | 1 | 1 | A4 lateral | 11 |
| 1 | 1 | 0 | 0 | | 12 |
| 1 | 1 | 0 | 1 | | 13 |
| 1 | 1 | 1 | 0 | | 14 |
| 1 | 1 | 1 | 1 | no use of cassette | 15 |

Further, automatic sensor switches 414 and 415 are provided for setting a mean level of the exposure intensity in the case of automatic exposure operation.

Three-unit mode paper supply magazine 1000 is movably mounted on a pair of rails 1040, said magazine comprising a loose stack of three cassettes 1010, 1020 and 1030. Numeral 1002 represents an electric sensor switch serving to sense the docking position of these three unit magazines with the copier proper. There is provided still a further electric drive motor M5, only schematically shown, serving to drive related chain-and-gearing mechanism, not shown, adapted for driving several paper feed roller pairs, shown only schematically and not specifically for avoiding excessively crowded drawing representation and by virtue of their very familiarity to those skilled in the art.

Numeral groups 1011–1014; 1021–1024; 1031–1034 represent respective sensor switches adapted for sensing sizes or formats of the papers appearing at the upper, middle height and the lower feed openings related with the three staged magazine units, respectively.

Numeral pairs 1015 and 1016; 1025 and 1026 and further 1035 and 1036 are respective switch pairs adapted for setting the respective kinds of the papers to appear at the said three stage paper feed openings, respectively.

Numerals 1017; 1027 and 1037 represent three different paper feed clutches corresponding to respective paper stack cassettes. When any one of these cassetes is specifically selected out, the corresponding one of three paper carrier roller pairs 1018; 1028 and 1038 corresponding to said three stage paper cassettes is brought into mechanical connection with said chain-and-gear drive system so as to deliver papers of specifically selected size or format from the related cassette to the copier proper 1.

Now turning to the ADF-mechanism 300 which is mounted at the top of the copier proper, as was briefly described hereinbefore. Although not specifically shown only for simplicity, part thereof is selectively openable and reclosable towards a glass panel or -window 11 so that it may be utilized as a conventional closable and openable document covering flap, not shown.

In this mechanism 300, a sensor 310 is provided for sensing a document to be copied, not shown, being placed on tray 304 or not.

Numeral 301 represents an electric motor adapted for driving a conveyor belt 301 of the mechanism 300. There is another electric motor 302 which is so designed and arranged to transfer the document, not shown, onto the conveyor 305 from the document supply tray 304.

(b) Operation panel

Figure 2B:
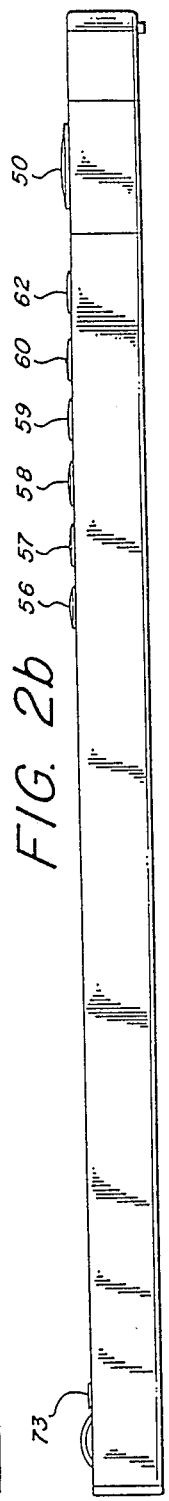
Figure 2C:
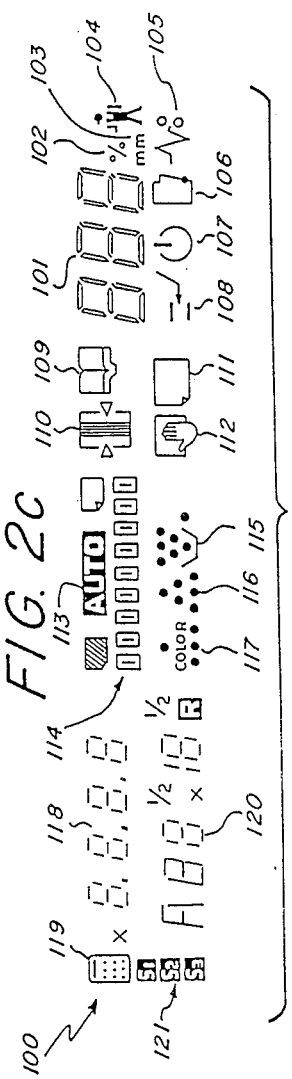
FIG. 2(c) is a plan view of a display unit comprising a number of luminescent display tubes.

An operation panel is shown in FIG. 2(*a*) and FIG. 2(*b*) jointly. On this panel, a number of keys are provided, as specifically illustrated with respective reference numerals to be set forth hereinunder.

Figure 3:
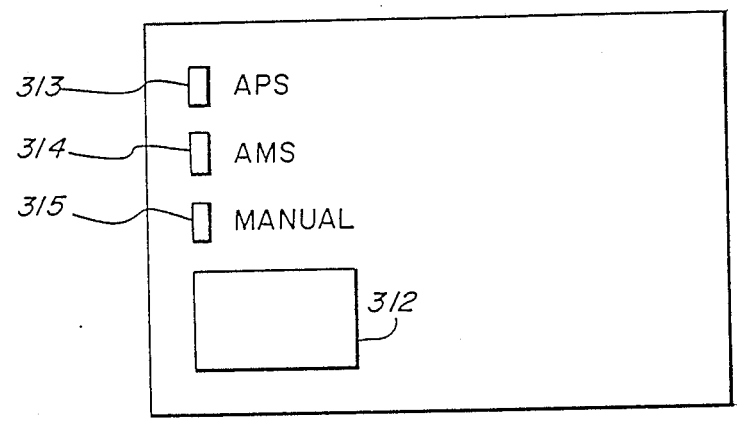
FIG. 3 is a plan view of a manipulation panel for the automatic document feeder device employed.

50 . . . print button for the initiation of copying operation(s);

51–60 . . . ten keys for setting the required number of copied papers or the like;

61 . . . key destined for interruption copying;

62 . . . key for stopping the multicopying service or for clearing the preset number;

63 . . . key for setting/release the automatic exposure service;

64 . . . key for reducing the exposure intensity in the manual exposure service;

65 . . . key for increase of the exposure intensity in the manual exposure service;

66 . . . key for selection of any desired one of the paper feed-in openings;

67–70 . . . keys for adjustment of the magnification factor for true size; two-size fixed reduction and one fixed size enlargement;

71 . . . key for copying magnification factor increment in a stepwise mode;

72 . . . key for copy magnification factor decrement in a stepwise mode;

73 . . . total check key for call of the total copy number display;

74 . . . all reset key for bringing the copy mode back to the initial state;

75 . . . anamofic copy mode selection key;

76 . . . calculation mode selection key;

77 . . . zoom magnification input key;

78–81 . . . zoom magnification selection keys for four selectively predetermined zoom magnification factors;

82 . . . margin copy mode selection key;

83 . . . copy mode selection key;

In FIG. 2(*c*), a display section 100 in the form of a luminesence display tube is provided for the display of a large number of different displays as follows:

101 . . . three digits display segments for showing copy paper sheet numbers and the like;

102 . . . a display representing that the numeral appearing at display 100 is an anamofic magnification percentage;

103 . . . a display representing that numerals appearing at display 101 showing a specifically selected paper margin size expressed in millimeters;

104 . . . a graphical display, when illuminated, to show necessity of a service man call;

105 . . . a graphical display, when illuminated, to show necessity of a jam call;

106 . . . a graphical display, when illuminated, to show the opened state of the door or inoperability of the three-unit paper feed cassette assembly;

107 . . . display for representing wait during the temperature adjustment, the lens move or the like operation;

108 . . . display for showing an interruption copying of the service;

109 . . . display for book copy alarm;

110 . . . anamofic copy alarm display which illuminates when the anamofic magnification factor (ratio of longitudinal traversal magnification aspect) should exceed the limited range;

111 . . . paper empty display;

112 . . . manual copy mode display;

113 . . . exposure mode (automatic or manual);

114 . . . exposure quantity stepwise display;

115 . . . display showing waste toner being full in waste vessel;

116 . . . toner empty display;

117 . . . color toner display;

. . . copy magnification show display;

119 . . . calculation mode show display;

120 . . . papar size display;

Now returning back to FIG. 2(*a*), the operation panel is provided further with the following display LEDs:

123 . . . monitor display;

124 . . . display LED for showing existence of an outside paper feed jamming;

125 . . . display LED for showing occurrence of a paper feed failure;

126 . . . display LED for showing failure in a separation job or carrying out;

127 . . . display LED for showing sorter jamming;

128 . . . display LED for showing failure in ADF-service;

130 . . . display LED for showing intentional selection of the upper paper feed unit;

131 . . . display LED for showing intentional selection of the lower paper feed unit;

132–135 . . . magnification selection key display LEDs;

136 . . . anamofic copy mode selection display LED;

137 . . . calculation mode selection display LED;

138 . . . zoom input selection display LED;

139–142 . . . zoom magnification factor selection display LED;

143 . . . margin copy mode selection display LED;

144 . . . display LED adapted for showing selected margin formation and an automatic size-reduction mode selection job;

145 . . . display LED adapted for showing a book copy mode selection job;

In FIG. 3, an operation panel provided at ADF 300 is schematically shown.

There is an LED 313 for showing automatic paper selection mode (APS) when selected out. Further, an LED 314 is provided for showing an automatic magnification selection mode (AMS) when selected out. A still further LED 315 is provided for showing manual mode operation when selected out. Numeral 312 represents a mode changeover key for selective changing of these operation modes one from another.

The term "automatic paper selection mode" (APS) as adopted herein throughout the specification and appended claims may be well defined in a manner that a specific and optimal paper size or format can be selected out automatically and in dependence to occasionally and preactically appearing documentary image, however, once designation of a specific paper size has been made.

On the other hand, the term "automatic magnification selection mode" (AMS) as adopted herein throughout the specification and claims may be well defined in a way that a specific and optimal projection magnification factor can be preset automatically in such a way that an occasionally introduced document image is copied on the paper within its effective size range, upon advance specifying an occasionally selected copy paper size factor or format.

(c) Detail arrangement of copier proper control section

Figure 4:
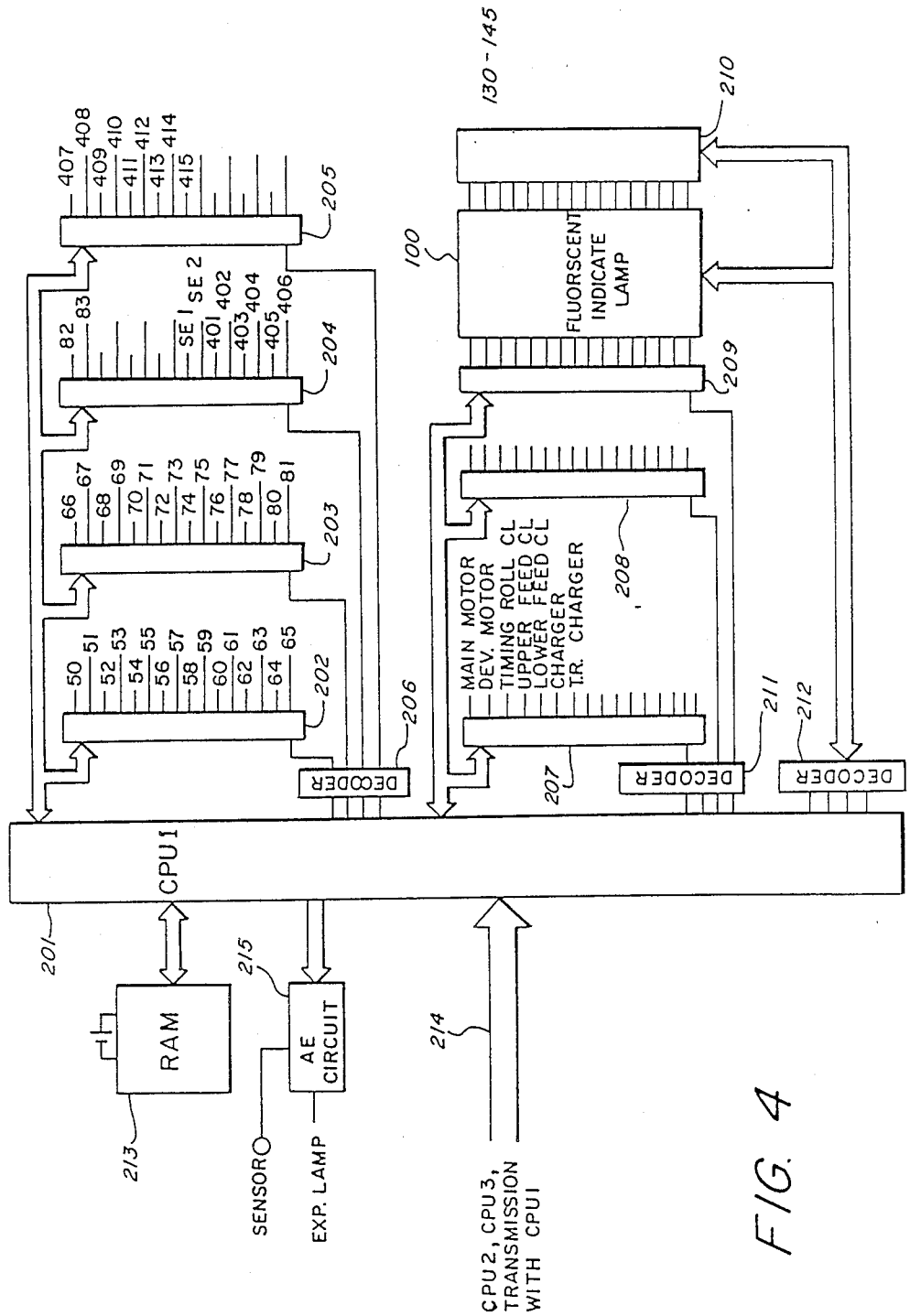
FIG. 4 is a circuitry for showing inputs and outputs, respectively to and from a microprocessor, or briefly first controller CPU1, adapted for control of the copier proper.

FIG. 4 shows the control section CPU1 denoted with reference numeral 201 and its related inputs and outputs schema.

ICs 202–205 and ICs 207–209 are provided for execution of the expanding service of the inputs and outputs, respectively. More specifically, ICs 202–205 are arranged as input IC and connected with the conroller CPU1 by data lines. On the other hand, ICs 202–205 are controlled by the controller CPU1 via decoder 206 as shown. The inputs of these ICs 202–205 are connected to various and numerous keys and displays as shown.

ICs 207–209 are arranged as output control elements for the controller CPU1, the control ports of the former being connected via decoder 211 to the latter, as shown, while the output terminals of these ICs are connected to various parts as representably shown, and to luminescent display tube group 100 and LED-matrix 210 (display LEDs 120–125 and 130–145) and are controlled by the CPU1 through a decoder 212.

RAM 213 is connected with the CPU1 as schematically and generally shown, its memory, not specifically shown being backed up with a battery 213a.

Bus 214 represents generally communication conductors with other CPUs, more specifically those denoted CPU2, CPU3 and CPU4. The CPU1 is so designed and arranged that in the selected case of a manual exposure operation it will transmit a control signal for any selected one of nine steps of exposure density to exposure light regulator circuit 216. Or alternatively, the selected case of automatic exposure operation, the CPU1 will deliver to the circuit 215 a control signal for setting the mean level of a predetermined automatic exposure light density range.

Figure 5:
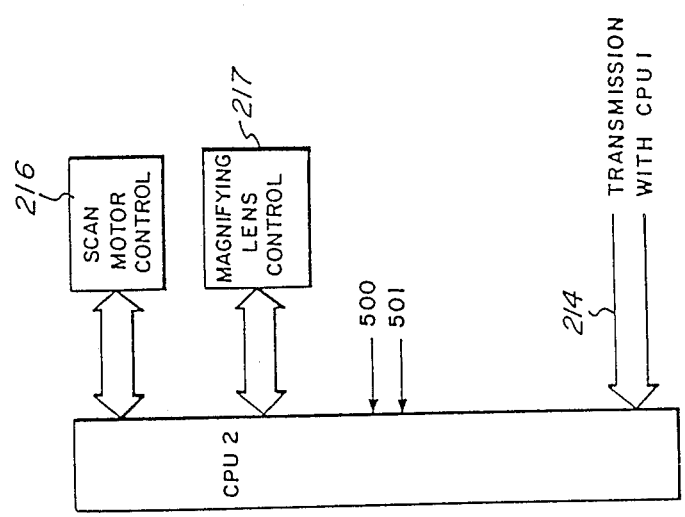
FIG. 5 is a circuitry for showing inputs and outputs, respectively, to and from a microprocessor, or briefly second controller CPU2 adapted for control of an optical system adopted.

In FIG. 5, the input and output relationship relative to the CPU2 provided for the control of the optical system. Numeral 216 represents a scan motor control circuit which is connected via a bus 216a with several input and output ports of said controller CPU2. The scan motor has been denoted with symbol M3 hereinbefore. Several input and output ports of the controller CPU2 are connected via a bus 217a with magnification lens control circuit 217 for said drive motor 4. An input port of CPU2 is connected with a predetermined position switch 500 for the optical system. A further switch 501 is provided to connect with a further input port CPU2 for delivery of a timing signal for energization of the timing roller pair 26 during a true size photo-copy service period when selected out. CPU2 performs the communication with CPU1 via the bus 214, with relation to FIG. 4.

Figure 6:
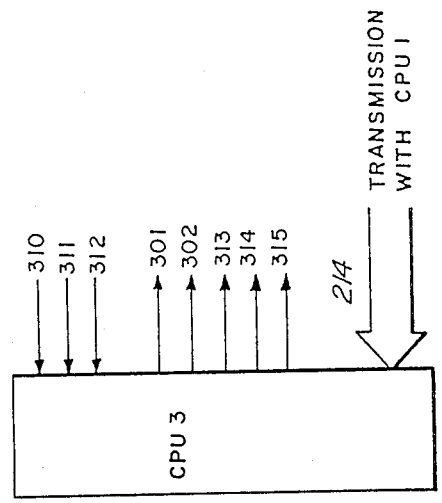
FIG. 6 is a circuitry for showing inputs and outputs, respectively, to and from a microprocessor, or briefly third controller CPU3 adapted for control of ADF.

In FIG. 6, an input- and output-arrangement of the third controller CPU3 provided for control of ADF 300 is shown. More specifically, input signals are fed from document feed sensor 310, document existence sensor 311 and copy mode changeover key 312, to respective input ports of the third controller CPU3 which is arranged to communicate via said bus 214 with the first controller CPU1.

Output signals from the third controller CPU3 are fed from its respective output ports to carrier belt motor 301; paper supply motor 302; to APS-display LED 312; AMS-display LED 313 and manual display LED 314.

In FIG. 7, an input- and output arrangement of a fourth controller CPU4 for the three unit mode paper supply section 1000 is shown. More specifically, several output ports of the controller CPU4 are connected to upper, middle and lower paper feed supply clutches 1017; 1027 and 1037, respectively. Further, the controller CPU4 is connected, as in the case of CPU1, with various sensors and the like (part thereof being shown by denoting a number of reference numerals) via ICs 221 and 222 which serve for expanding inputs and outputs to and from the CPU4.

(d) Special purpose copy modes (margin copy mode; anamo-copy mode and book copy mode)

Margin copy mode

Figure 8:
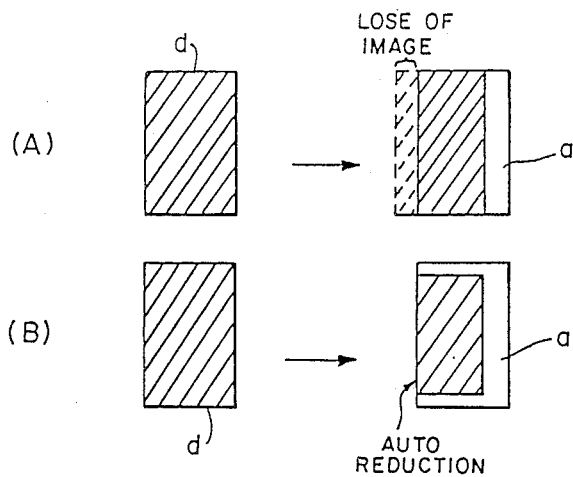
FIG. 8 is an explanatory schema to explain the margin copy mode photo-copying operation.

In the case of a margin copy mode operation (refer to FIG. 8), a specifically specified and dimensioned file margin or briefly denoted therein with "a", can be provided at the righthand side of the copy paper. In a case where the document has no margin, the provision of a file margin can provide substantially easier filing facilities.

In the present embodiment of the invention, there are provided two different modes. In the first mode, the images are simply translated in its position by such an amount equal to the file margin (refer to FIG. 8(A)). In this case, if the offset marginal area of the document is not blank, the copied images will constitute a kind of dropout.

In the second mode, and in order to eliminate the foregoing image dropouts, calculation is made for automatic determination of a properly selected size reduction rate, based upon copy paper width (paper length) and margin size, and equal to: (paper length minus margin size)/paper length. Then, an optimal magnification rate is automatically determined.

Anamo-copy mode

Figure 9:
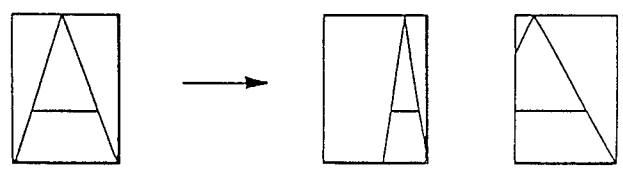
FIG. 9 is an explanatory schema to explain the anamo-copy mode photo-copying operation.

In the anamo-copy mode as adopted in the present embodiment, such a measure has been adopted as to shorten or lengthen, as the case may be, the longitudinal image dimension by varying only the speed of the scanner while the lateral image dimension of the copy as defined by the lens location is kept at a constant value, as schematically illustrated in FIG. 9.

Since it has been observed that when the anamo-magnification factor (longitudinal/lateral ratio) is not within a specifically selected range such as, preferably, 95–105%, the degree of resolution will drop substantially beyond the optimally adoptable value, an alarm display 110 is illuminated for giving notice of the fact to the user.

If it should be desired, a stable and clear copy formation is realized by introducing specifically designed lens means into the optical route or system.

Book-copy mode

Figure 10:
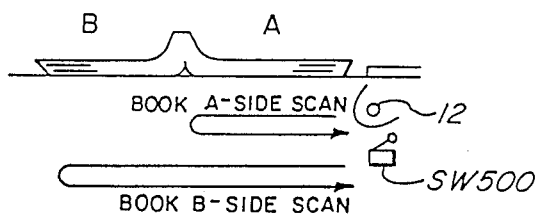
FIG. 10 is a schematic representation for the illustration of the book copy mode copying.

In the book copy mode operation when selected out, as schematically shown in FIG. 10, wherein two open-out successive pages, of a book representing the document, being representatively and generally designated as "A" and "B", are to be photo-copied, the desired successive copying of these two pages will be executed upon down-manipulation of the print button.

(e) Operation of the copier proper

In the following, the content of the program for the CPU1 adapted for controlling of the copier proper will be set forth in general sense.

e-1: Main routine

Figure 11:
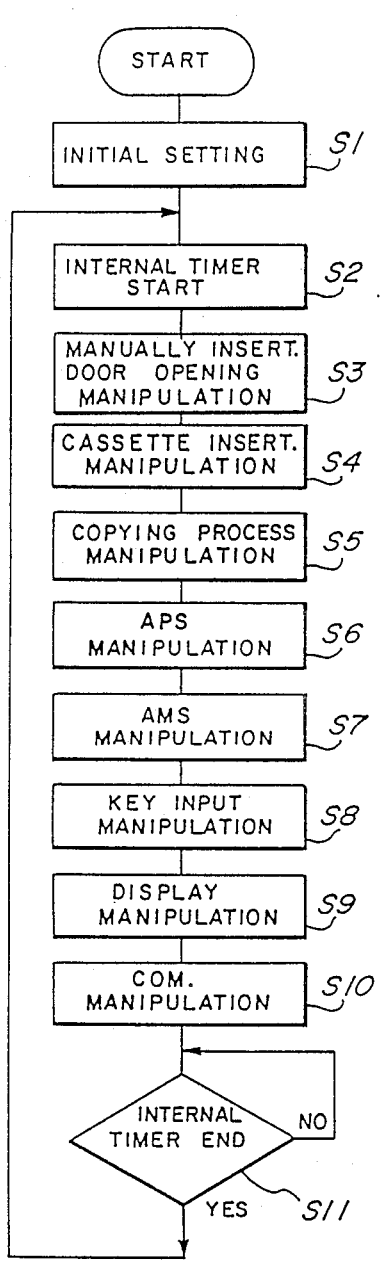
FIG. 11 is a flow chart of the main routine of a program for controlling the copier proper.

In FIG. 11, an operational flow chart of the first controller CPU1 is shown in general sense.

When the program starts upon resetting of the controller CPU1, an initial setting S1 to initialize the CPU1 and to bring the related devices to their initial mode state is brought about which includes a clearing operation at the RAM and a setting of various registers.

Next, an inside timer contained in the first controller CPU1 and preset in advance to its initial set value is caused to start (Step S2).

Further, various succeeding manipulations such as manual paper insertion door opening manipulation S3; cassette insertion manipulation S4; copying operation S5; automatic paper selecting manipulation S6; automatic magnification selecting manipulation S7; key manipulation S8; and display manipulation S9 are executed. Then, data communications of the first controller CPU1 with the second, third and fourth controllers 2, 3 and 4 are executed (step 10).

Upon execution of all of the foregoing sub-routine manipulations and when the initially set period has been lapsed (step 11), one routine job is completely performed and then the routine will be returned to step 2, and so on.

Using the length of the above one routine time period as a counting unit, various timers called for the above routine perform their count (each of these preset timers is adjudged to have consumed its time limit by counting out its specifically allocated number of routine cycles).

e-2: Manual paper insertion door opening manipulation

Figure 12:
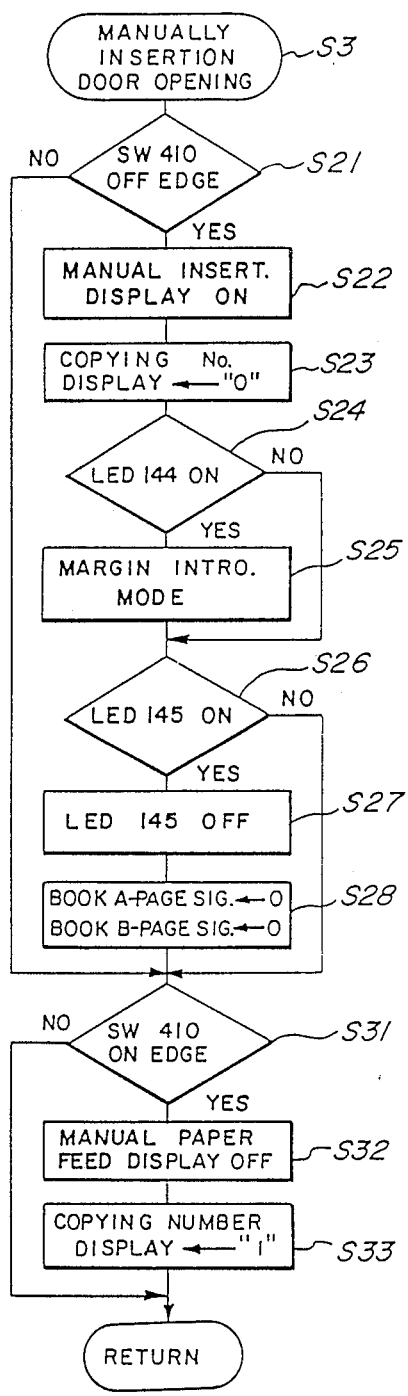
FIG. 12 is a flow chart of a sub-routine for control of processor concerning a manually operable door to the copier proper.

In FIG. 12, the routine S3 for the said door opening manipulation is schematically shown.

At first, the opening of the door is sensed by and at switch 410 by the appearance of the OFF-edge (step S21). If such a door opening is not sensed, the routine will be advanced with a move to step 31.

If, however, the door opening is sensed in the above-mentioned way, manual insertion display 112 will be ignited (step 22). Then, copy sheet number display 101 is changed over to act as an addition counter and demonstrates the initial value "0" (step 23).

Next, observe if LED 144 is On to show the selected operation mode is "margin plus automatic size reduction mode" or not (step S24). If yes, this mode must be released for transferring automatically to the "margin introduction mode", and a call is made for "margin introduction routine (refer to FIG. 27) (step S25). It should be noted at this stage that the said term "margin plus automatic size reduction mode means such that a proper and optimum size reduction rate is automatically calculated based upon the currently appearing paper lengthwise dimension and presently specified margin size. In the case a manual paper feed copying operation fs preferred, the paper's lengthwise dimension cannot be determined the first instance and therefore, the said "margin size plus automatic size reduction mode" must be automatically released.

Next, observe the book copy mode selection display LED 145 is in its ignited state to show the book copy mode has been selected out or not (step S26). If it is observed to be true, the LED 145 is caused to extinguish (step S27), since the manual feed copy size is unknown and the desired book scanning cannot be executed by automatically releasing the book copy mode by changing both the book B-page signal and the book A-page signal to "0" (step S28).

Further, when the appearance of the ON-edge at switch 410 is sensed to show that the manual paper feed door has been closed (step S31), the manual paper feed display 112 is extinguished (step 32) and copy the sheet display 101 is changed to "1" (step 33). Then, the routine is caused to return.

e-3: Cassette insertion process

Figure 13:
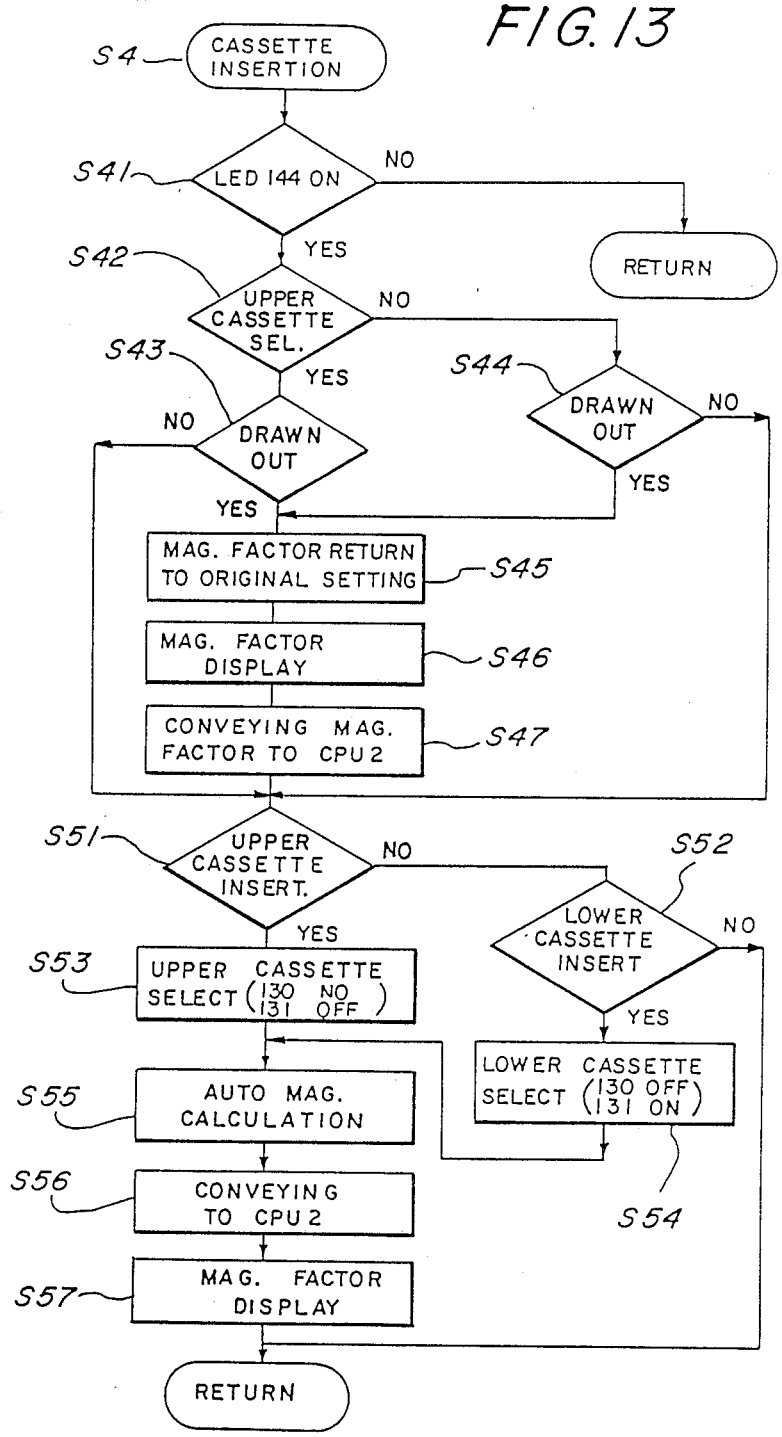
FIG. 13 is a flow chart of a sub-routine adapted for control of cassette-introduction process.

In FIG. 13, a cassette insertion process routine S4 is schematically shown. More specifically, when the LED 144 is kept ON which means that the "margin plus automatic size reduction mode" has been selected (step S41) and further if the upper cassette has been selected (step S42) and drawn out (step S43), or otherwise if the lower cassette has been selected out and drawn out (step S44), the appearance of the respective edge will cause the copy magnification factor to be varied to the original setting one (hitherto adopted one before selection of the automatic size reduction) (step S45). Then, the thus varied factor is displayed (step S46) and the corresponding signal is conveyed to the second controller CPU2 (step S47).

This operation could be more specifically understood when the following explanation is read.

It should be understood that before the draw-out operation of either selected-out cassette, the copy magnification factor was determined by reliance to the lengthwise dimension and margin size of the paper. After draw-out of the cassette, however, said factor cannot be calculated. Thus, the magnification factor must be automatically returned to the foregoingly adopted one as has been explained above.

Next, the upper cassette or lower cassette are newly introduced into position (step S51 or S52). By this operation, the corresponding paper feed opening is automatically selected (steps S53 and S54) and at the same time, a proper copy reduction factor, as defined by the lengthwise dimension of the paper plus copy margin and there being no fear of an overall copy image deficiency, is automatically calculated (step S55) and its data will be conveyed to the second controller CPU2 (step S56). Then, this newly set magnification factor is displayed (step S57).

Figure 14A:
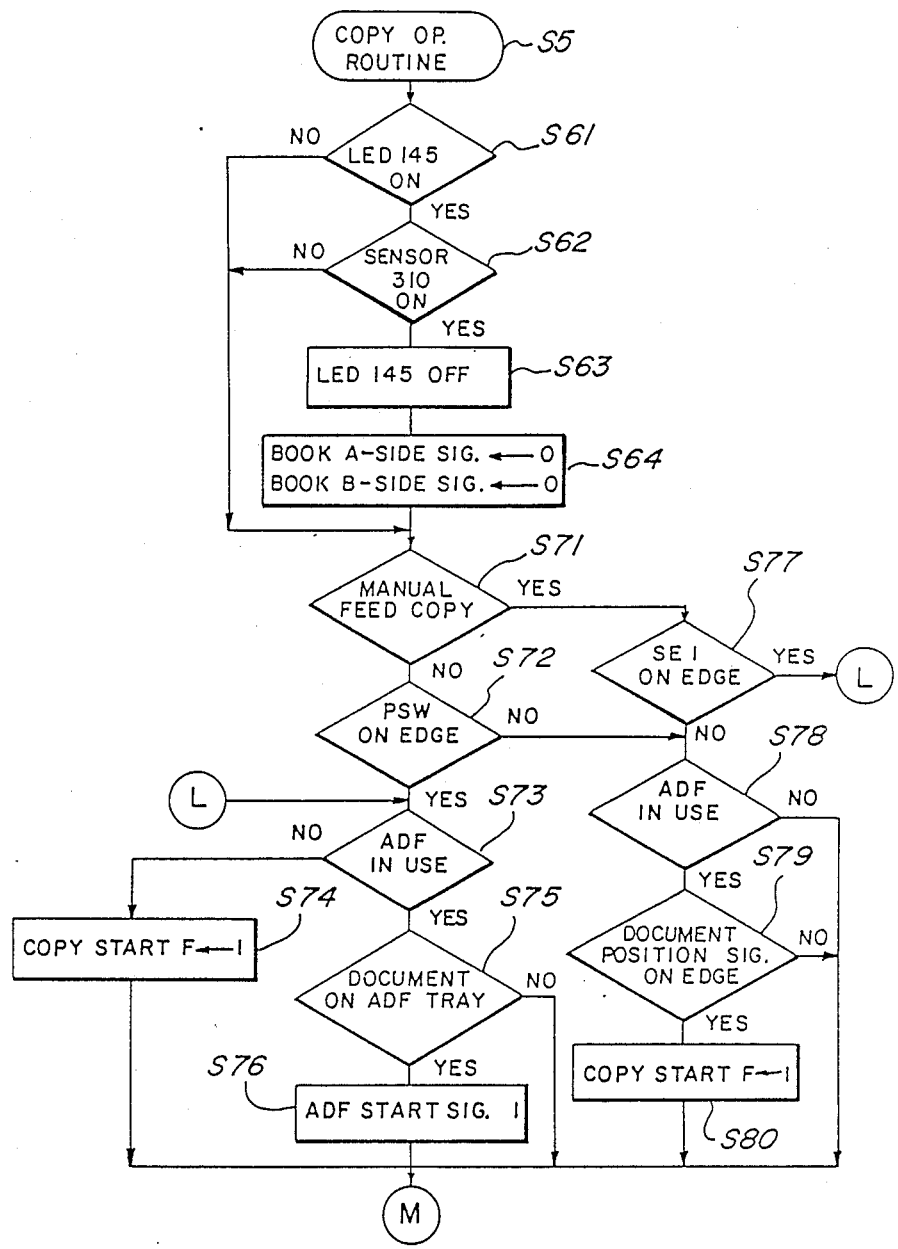
FIGS. 14(a), (b) and (c) represents jointly flow charts of a sub-routine concerning the copying operation.
Figure 14B:
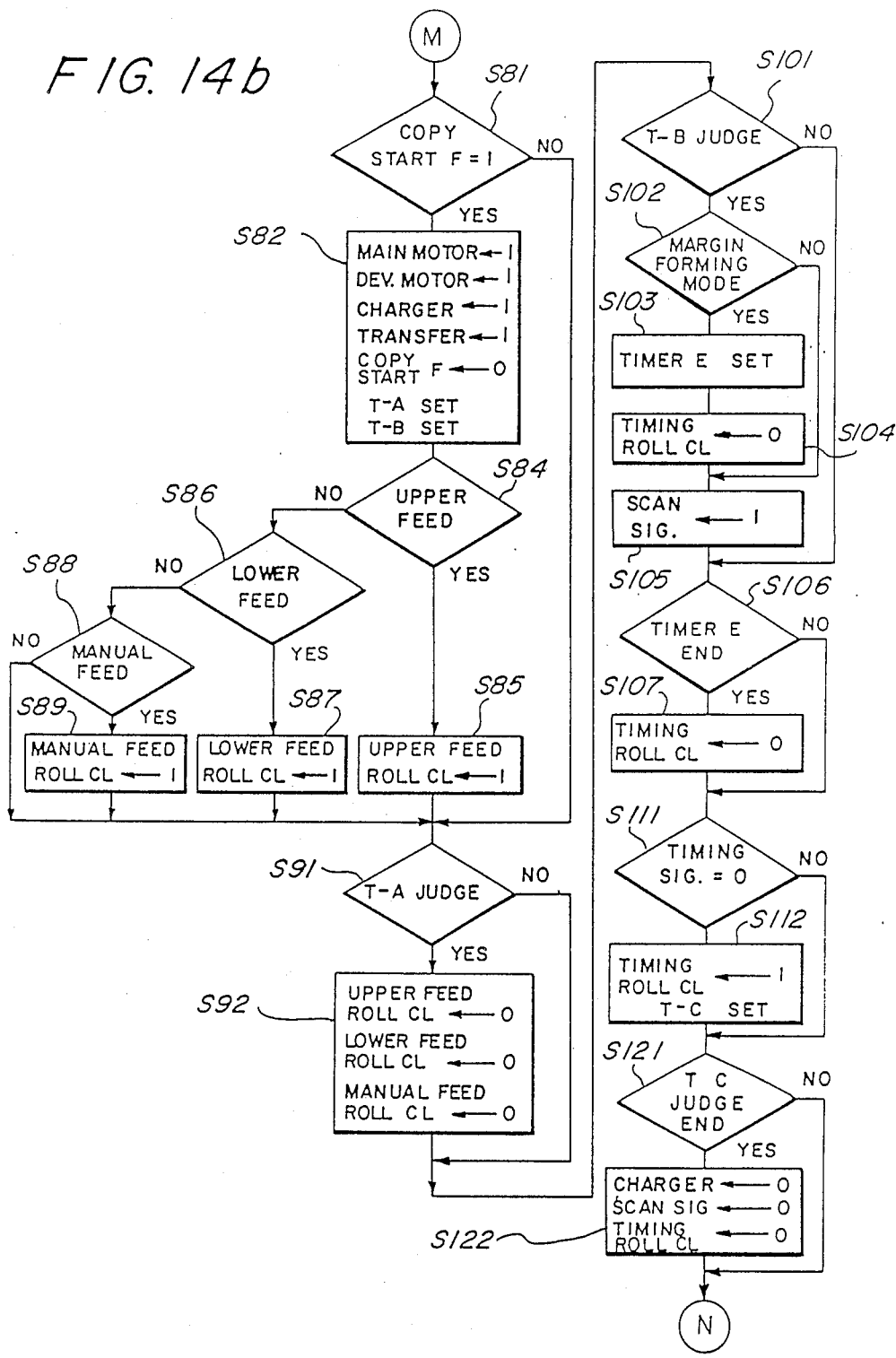
Figure 14C:
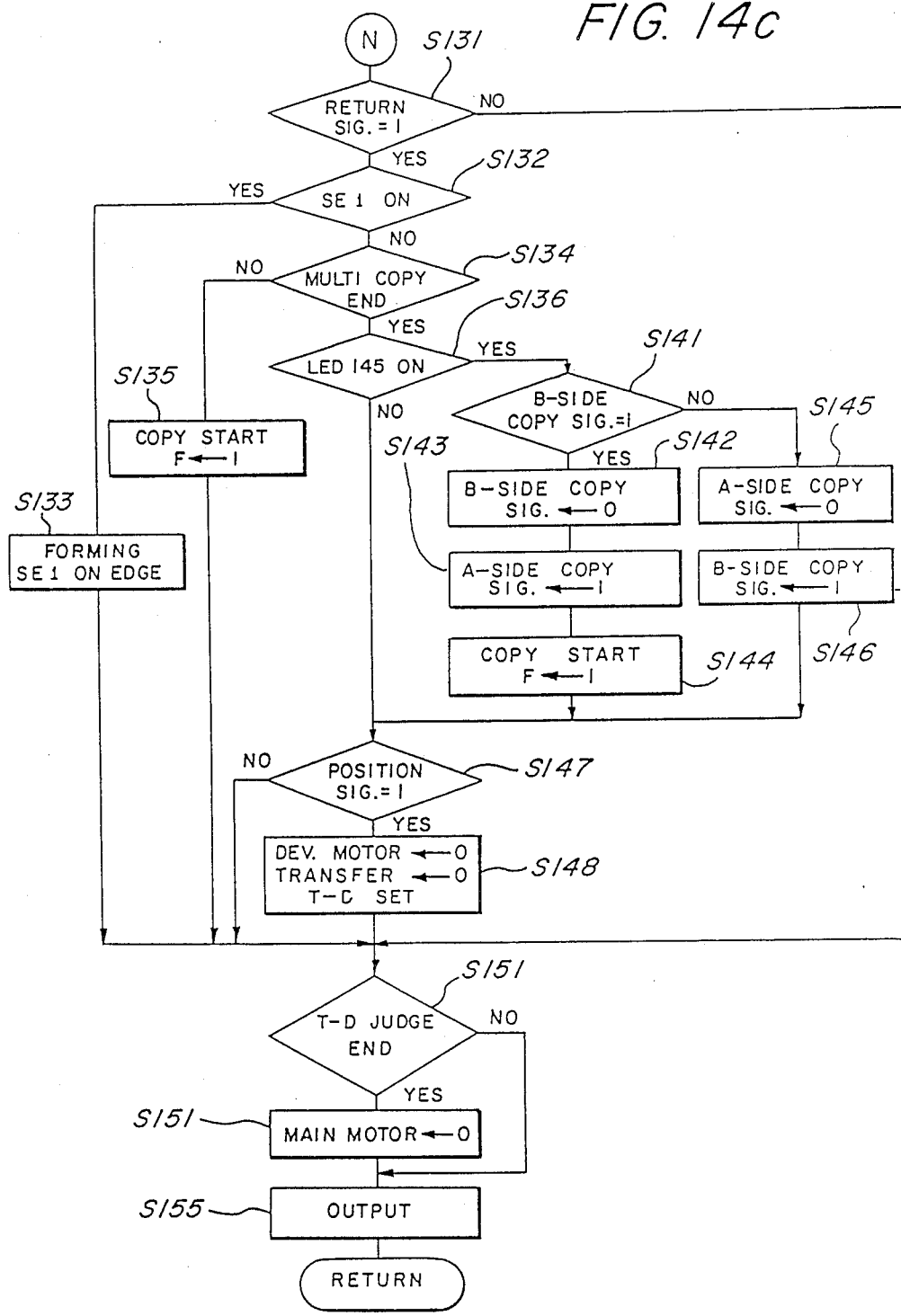

The foregoing description has been directed to our commercially standardized copier machine fitted with two stage, upper and lower cassettes only. However, the machine may be fitted, as an optional equipment in accordance with the consumer's request, with three stage, upper, middle and lower cassettes, as a unit, as was already mentioned only briefly at 1000 hereinbefore. In this case, similar operations as described above can be executed for the respective cassettes 1010; 1020 and 1030 for the purpose of the present invention.

e-4: Copying operation:

In FIGS. 14(a), 14(b) and 14(c) in combination, copying operation routine S5 is schematically shown.

When the LED 145 is kept ignited during the book copy mode (step S61), and when a document is introduced in the ADF tray, the appearance of an introduced document edge is sensed by document sensor 319 (step S62), said LED 145 is extinguished (step S63) showing an automatic cancellation of once selected book copy mode (step S64). This is for the reason that with use of ADF 300, the book scan control becomes meaningless and thus must be automatically canceled out.

Without use of the manual paper feed copying (step S71) and with the ADF which is now not in use (step S73), the appearance of the ON-edge at print button (printing initiation button) 50 (step 72), a copy-initiation flag is energized to "1" (step S74).

With use of the ADF (step S73) in place of the manual feed, an existence of a document on the ADF tray, (step S75) as adjudged by document sensor 311, the ADF-start signal at ADF 300 will become "1" (step S76). During other timing periods than ON-edge at the print button 50 (step 72) and if the ADF is used (step 78) and the document correct position signal from ADF 300 representing a signal or briefly called "document position signal" to be described more fully hereinafter, turns to "1" (step 79), copy initiation flag will turn to "1" (step 80). Next, in the case of manual paper feed copying (step S71), similar functions as were performed with the appearance of the ON-edge at the print button switch SW50 can be made at the appearance of the ON-edge (step 77) at the sensor SE1 adapted for sensing the opening of a manual paper feed insertion opening (steps S73–S76).

When, in step S81, the copy start flag turns to "1", a main motor M1 and developing motor are turned on; an electrostatic charger; an image transfer charger and the like are also turned on; a copy start or initiation flag is turned to "0", a "T-A" (timer A) serving to stop the paper feed roller pair and a "T-B" (timer B) serving to inhibit other operations until the paper reaches the timing roller pair 26, are brought into setting (step S82).

If the upper paper stack cassette has been selected (step S84), the upper paper feed clutch is brought to ON (step 85).

On the contrary, if the lower paper stack cassette has been selected (step S86), the lower paper feed clutch is brought to ON (step S87).

If the manual paper feed is selected (step S88), the manual paper feed roller clutch is brought to ON (step S89).

At the next step S91, the timing "T-A" is adjudged and if this timing has been ended, the upper and lower paper feed roller clutches and the manual paper feed roller clutch are all brought to OFF (step S92).

At the further step S101, the timing "T-B" is adjudged and if the timing has been ended, and if the margin forming mode is adopted (step S102), a timer E is caused to start (step S103) for performing a partially advanced and leading feed of the paper by an amount corresponding to the scheduled marginal amount, and the timing roller pair 26 is made ON (step S104) and the scan signal is turned ON for its delivery (step S105). And, upon completion of the timing at the timer E (step S106), the timing roller pair 26 is stopped (step S107).

If the selected operation is not of a margin-forming mode, the said partially advanced and leading paper feed is not executed. The scan signal delivery is made just at the completion of "T-B"-timing period.

As shown in FIG. 14(b) at step S111, when the timing signal becomes "1", the clutch of timing rollers 26 is turned ON, the timer "T-C" having a timing period substantially corresponding to the copying time period necessary for one sheet of paper, is caused to set (step S112).

Upon completion of the timing at "T-C" in the step S121, the electrostatic charger, the scan signal . . . and the timing roller clutch are turned OFF (step S122).

When the return signal at step S131 and for the optical system is "1", or in other words the return operation is initiated, if the sensor SE1 at the manual paper feed opening is adjudged ON or not (step S132). If On, it is adjudged that the mode is a multi-manual paper feed mode and the next manually fed paper is already in position, ON-edge information at the sensor SE1 is artificially formed (step S133) so as to let the next succeeding manual copying mode to be brought about. By adopting this procedure, the manual copying mode operation is automatically and successively continued, so far as a paper stack remains set at the manual paper feed opening.

Next, the copying operations in the scheduled multi-copy mode are adjudged to be completely performed or not (step S134). If not, the copy start flag is set to "1" (step S135).

In case a book copy mode is selected, with the LED 145 being ignited (step S136), an adjudgement is made if the B-page copy signal is "1" or not (step S141). If the value is "1", copying the operation for the document page B is executed (step S142) and the A-page copy signal is turned to "1" (step S143), the copy start flag is turned also to "1" (step S144) for executing an A-page copy operation. When the flag shows "0", it represents that the A-page copying job has been completed (step S145) and a B-page copying operation is called for (step S146), thus, waiting for the next printing operation. And, when the scanner once moved from the destinated position returns thereto, position sensor SW 500 will become ON (step S147), and the developing motor and the transferring job are caused to cease, and "T-D" is set (step S148).

Figure 15:
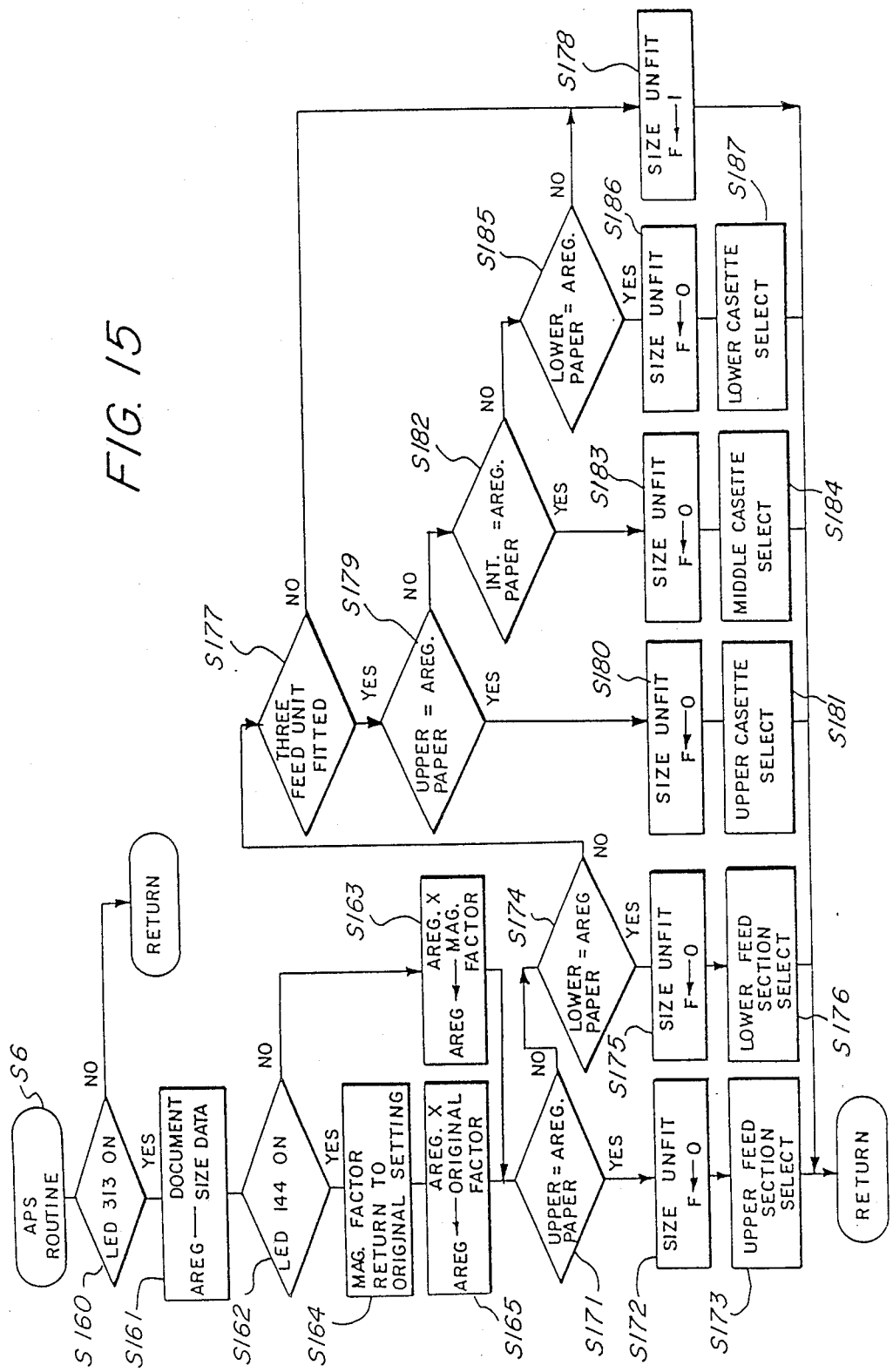
FIG. 15 is a flow chart of a sub-routine for execution of the automatic paper selection processing.

Upon termination of the time limit at "T-D" (step S151), the main motor M1 is caused stop. Then, all the operational results so far obtained are forwarded to in form of respective output signals (step S155).

e-5: Automatic paper selection:

In FIG. 15, automatic paper selection routine S6 is schematically shown.

With the ignition of the APS-mode display LED 313 (step S160), document size data sensed at third controller CPU3 and transmitted are once stored in an A-register (step S161).

Next, if the "margin-formation plus automatic size reduction mode selection" display LED 144 is ON or OFF (step 162). If OFF, a size magnification factor is introduced as multiplier into said A-register. Or more specifically, paper size data in terms of paper's longitudinal and lateral size dimensions are multiplied with the occasionally selected-out magnification factor (step S163).

On this stage, however, it should be mentioned that the presently adopted magnification factor is only a provisional value which has been fixed by calculation based upon the currently selected-out paper length as well as scheduled margin size, and that this provisional copying magnification factor must be returned to the originally setting one which is in fact represented by a "copy magnification factor divided by (selected-out paper length minus scheduled paper margin size)/-selected-out paper length" (step S164). Then, this amended factor is brought as the true multiplier into the A-register (step S165).

Next, a suitable one of paper feed openings is selected by use of the amended and stored in the A-register. If the paper size data stored therein are in coincidence with the practical paper size of the upper paper stack cassette (step S171), the size-unfitness display flag is made to show "0" (step S172) and the upper cassette is selected out (step S173).

On the contrary, if the size data at A-register are in coincidence with the paper size of the lower paper feed cassette (step S174), the size unfitness display flag is turned to "0" and the lower cassette is selected out (step S176).

Next, three stage paper feed unit has been fitted or not is adjudged (step S177). If not, the size-unfitness display flag is turned to "1" (step S178), and then a return operation will be performed.

If the yes, and if size data stored in the A-register is in coincidence with the paper size at the uppermost paper supply magazine (step S179), the size-unfitness display flag is turned to "0" (step S180), the uppermost cassette of the three stage unit is selected out (step S181).

In such a case, where the stored size data the in A-register is in coincidence with the paper size at the middle cassette of the three stage unit (step S182), the size-unfitness display flag is turned to "0" (step S183), the middle cassette is selected (step 184).

On the other hand, if the stored size data in A-register is in coincidence with the paper size at the lowermost cassette of a three-stage unit (step S185), the size-unfitness display flag is turned to "0" (step S186), the lowermost cassette of the three stage unit is selected (step S187).

If not, the routine will advance to the next step S178.

e-6: Automatic magnification factor selection procedure

Figure 16:
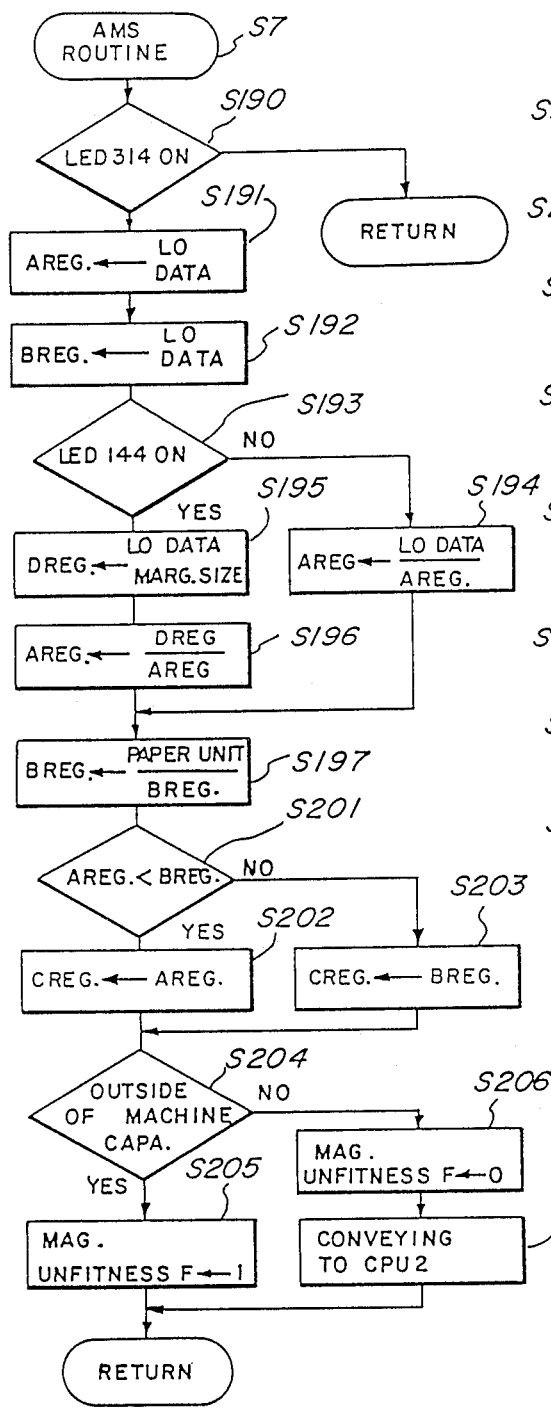
FIG. 16 is a flow chart of a sub-routine for execution of the automatic magnification rate selection processing.

In FIG. 16, automatic magnification ratio selection routine S7 is schematically shown.

With the ignition of an AMS-mode display LED·314 (step S190), the longitudinal length dimension taken among the document size data as sensed at and transmitted from the third controller CPU3 (ADF) are once stored in the A-register (step S191) while the lateral length data similarly taken out are once stored in B-register (step S192).

Next, the ON or OFF state of display LED 144 adapted for showing a "margin size formation plus automatic size reduction mode" is adjudged (step S193).

If OFF, the longitudinal length of the paper divided by the memorized data at the A-register (document's lengthwise dimension) is once stored in A-register (step S194).

If LED 144 ON, or in other words, in the case of "margin size plus automatic size reduction mode", taken as a provisional and artificial paper's longitudinal length, by reducing the scheduled margin size from the longitudinal length of a paper, and then, based thereon, a magnification ratio is calculated and stored in the A-register (steps S195; S196). By adopting the foregoing procedure, the desired automatic calculation of the magnification ratio under consideration of the scheduled margin size can be easily and accurately performed. In a similar manner, the lateral magnification ratio can be calculated and stored (step S197).

Further, the lesser one of both magnification ratios stored in the A- and B-registers is read out and stored in the C-register (steps 201–203).

If the final data thus determined and finally stored in the C-register should stand outside of the machine capacity, more specifically outside of the machine's polarized magnification range (step S204), a magnification flag is turned to "1" (step S205).

On the contrary, if the ratio resides within the machine performance, the said flag is turned to "0" (step S206), and the stored data is read out from the C-register and transmitted to a second controller CPU2 (step S207).

Therefore, it may be well understood that otherwise possible excess reduction of the printed images even if the machine operates under combination of margin size counted-in, size reduced copy mode with automatic magnification ratio selection mode.

e-7: Key manipulation modes

Figure 17:
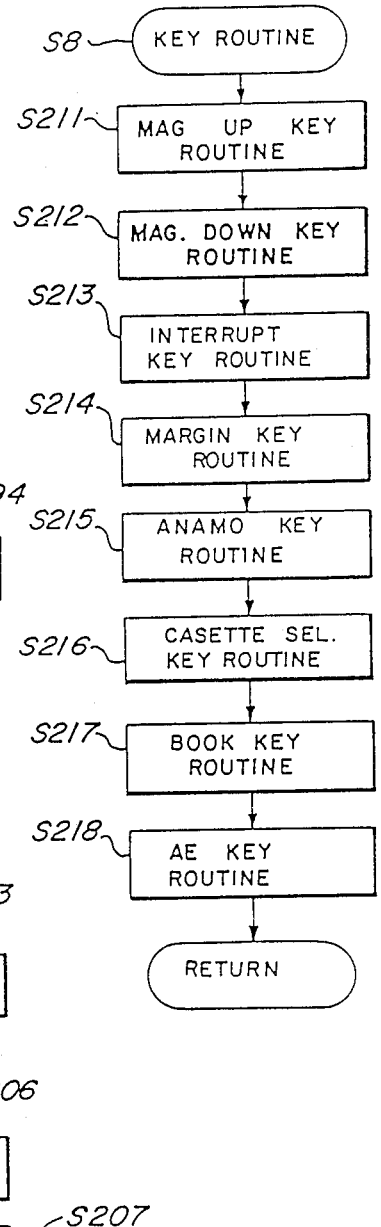
FIG. 17 is a flow chart of a sub-routine for execution of key operation processing.

In FIG. 17, key manipulation routine S8 employed herein is schematically shown.

In this routine, magnification-up key 71 (step S211); magnification-down key 72 (step S212); interruption key 61 (step S213); margin copy mode selection key 82 (step S214); anamo-copy mode selection key 75 (step S215); paper feed opening selection key 66 (step 216); book copy mode selection key 83 (step S217) and automatic exposure key 63 (step S218) are successively manipulated.

e-7-1: Magnification-up key manipulations

Figure 18:
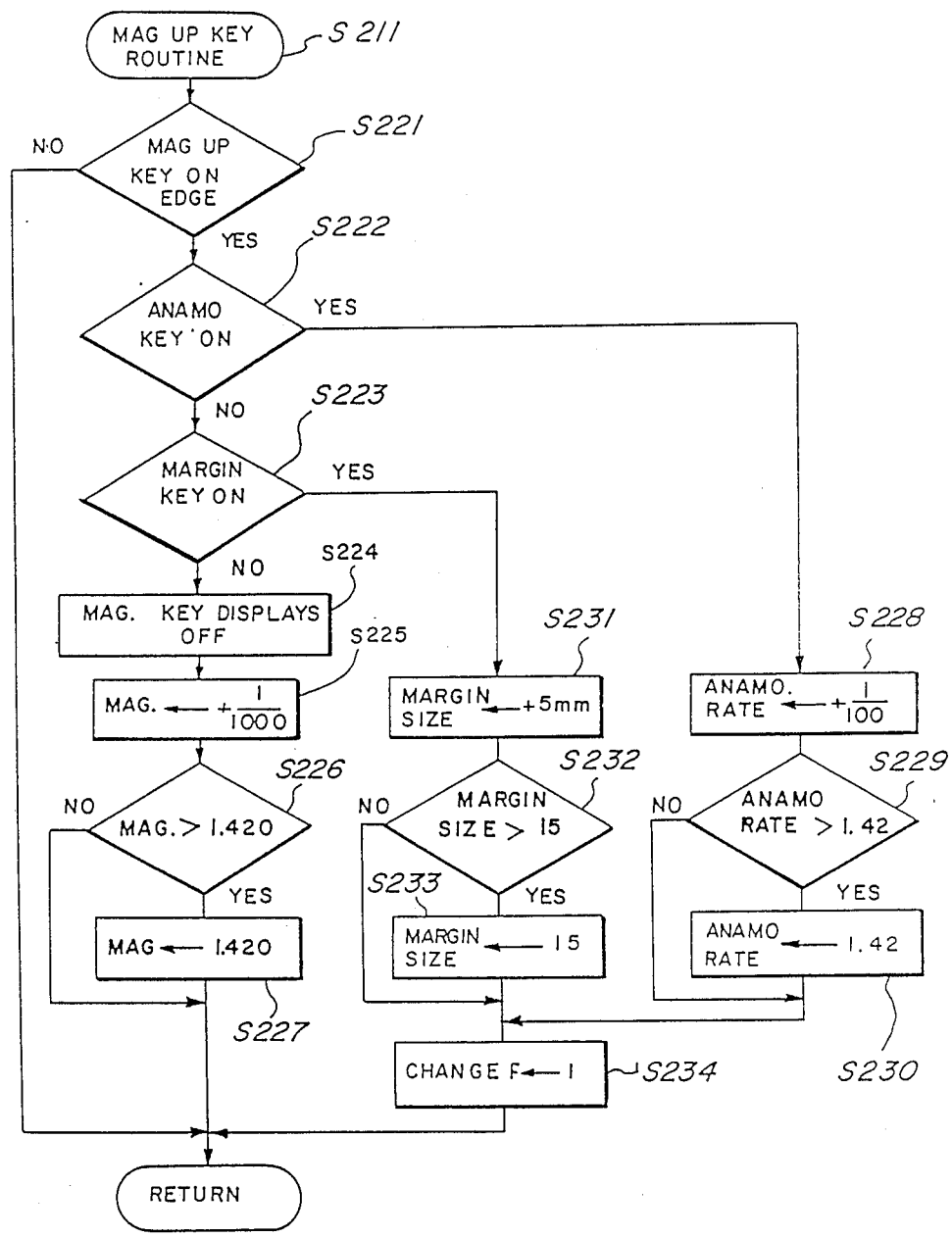
FIG. 18 is a flow chart of a sub-routine for execution of the magnification rate-up key processing.

In FIG. 18, magnification-up key manipulation routine is schematically shown.

Magnification-up key 71 is normally used as such for the increase of the copy-magnification rate.

In such a case, however, that, if the key 71 is made ON while the anamo-copy mode selection key 75 is kept in ON, the anamo-rate will be increased by 1% for each manipulation.

On the other hand, if the key 71 is made ON while the margin copy mode selection key 82 is kept in ON, the copy margin size will be increased by 5 mm for each manipulation.

Now assuming that at appearance of the ON-edge at magnification-up key 71 (step S221), the anamo-copy mode selection key 75 is ON, or in other words, while the key 75 is kept ON, the key 71 is made again ON (step S212), an anamo-rate memory is added each time with a definite value of 1/100 (or 0.01) for each operation (step S228). As a result, if the anamo-rate memory should have a higher memory content than 1.42 (step S229), the memorized value will be reducingly corrected to 1.42 (step S230).

Now further assuming that magnification-up key 71 is made ON while the margin sized copy mode selection key is held ON (step S223), margin a size memory is added each time with a definite value, 5 mm for each operation (step S231). As a result, if the margin size memory should have a higher 15 mm (step S232), it is subjected to a reducing correction to show 15 mm (step S233).

In the both cases above mentioned, a change operation flag is turned to "1" (step S234).

If both the anamo-copy mode selection key 75 and the margin copy mode selection key 82 are OFF, the magnification key displays 132–135 and 139–142 are extinguished (step S224), on account of incoincidence of the magnification factor with that which was memorized in these magnification keys. And then the magnification factor is added with a decimal number of 1/1000 (step S225). As a result, if the magnification factor should exceed 1.420 (step S226), it will be subjected to a reducing correction job to 1.420 (step S227).

e-7-2: Magnification-down key manipulations

Figure 19:
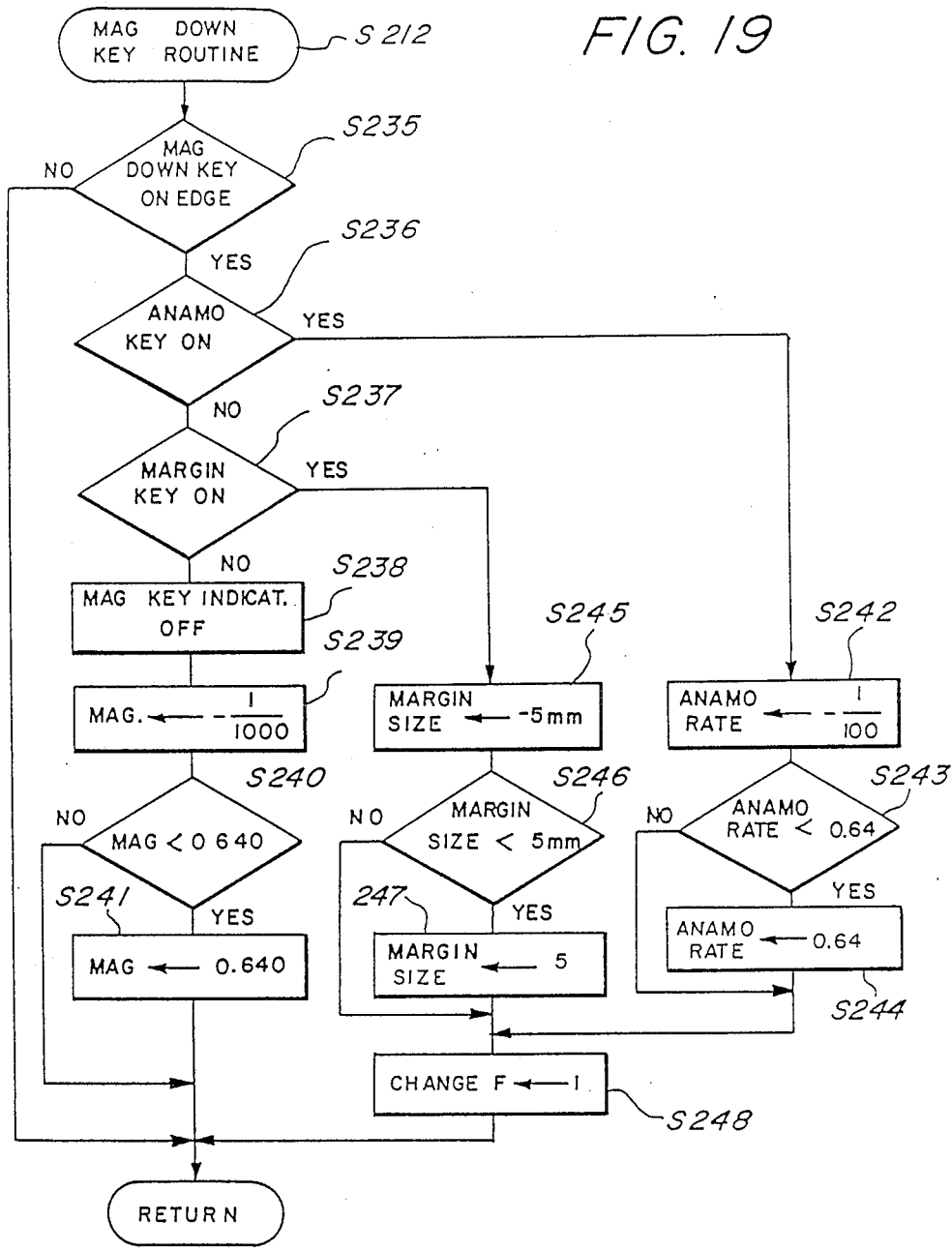
FIG. 19 is a flow chart of a sub-routine for execution of the magnification rate-down key processing.

In FIG. 19, a magnification-down key manipulation routine (step S212) is schematically shown. This key 72 has been shown in FIG. 2(a). Normally, this key is used for the downoperation of the copy magnification factor. If, however, this key 72 is made ON upon the ON-operation of the anamo-copy mode selection key 75, the anamo-rate is caused to down just by 1% for each such operation. On the other hand, if this key 72 is made ON upon the ON-manipulation of the margin copy selection key 82, the margin size will be caused to reduce just by 5 mm for each of such manipulations.

With the appearance of ON-edge at magnification-down key 72 (step S235) while the anamo copy mode selection key 75 is kept ON, or more specifically, when the key 71 is made ON (step S236) while the key is kept in ON (step S236), the memorized content in the anamo-rate memory is each time subjected to a reduction by a definite decimal amount, 1.100 or 0.01 (step S242).

As a result, if the content in the anamo rate memory should become less than 0.64 (step S243), it is addingly amended to 0.64 (step S244).

Or alternatively, in the case of margin copy mode selection key 82 being held at ON, or more specifically, if the magnification rate-down key 72 is made ON (step S237), while the margin copy mode selection key 82 is kept in ON, the content of the margin size memory is subjected each time to a reduction by just a definite amount of 5 mm (step S245).

As a result, if the margin memory content should become less than 5 mm (step S246), an increasing correction job will be executed to 5 mm (step S247). In either case, the change operation flag is set to "1" (step S248).

If anamo-copy mode selection key 75 and the margin copy mode selection key 82 are both OFF, the magnification key displays 132–135 and 139–142 are extinguished (step S238), because of that the scheduled magnification rate is different from that which has been stored in the magnification rate key. And then, the anamo-magnification rate is reduced just a decimal value of 1/1000 (step S239). As a result, if the magnification rate should become less than 0.640 (step S240), it is subjected to an enlarging correction job, so as to show 0.640 (step S241).

e-7-3: Interruption key operations

Figure 20B:
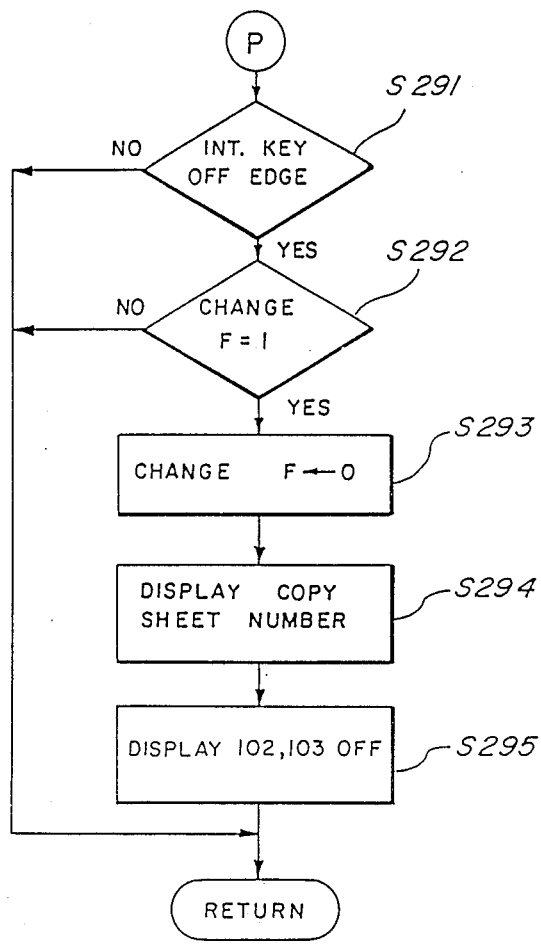

In FIG. 20, interruption key manipulation routine S213 is schematically shown.

At the appearance of the ON-edge of interruption key 61 (step S251), if the interruption copying mode 108 is in extinguished state (step S252), this display 108 is caused to ignite and the copy mode information (number of copy sheets; magnification factor and the like) is stored (step S253).

If the anamo-copy mode selection display LED 136 is being ignited, or more specifically, the "anamo-copy mode" has been selected (step S254), a anamo-interruption flag is made to "1" (step S255).

If margin-copy mode selection display LED 143 is being ignited, or more specifically, the "margin-forming mode" has been selected (step S256), margin-interruption flag is made to "1" (step S257).

If the margin formation plus the automatic size reduction mode selection display LED 144 is ON, or more specifically, the "margin plus automatic size reduction mode" has been selected (step S258), a margin reduction interruption flag is made to "1" (step S259).

If interruption key 61 is made ON, while the interruption copying display 105 is being ignited this state represents an interruption release, thereby display 108 is extinguished and the stored copy mode is subjected to return (step S261). If the anamo-interruption flag represents "1" (step S262), the machine condition must be returned to the anamo-copy mode", because of the fact that before entering into interruption, the state was of "anamo-copy mode". Then, the anamo-interruption flag is returned to "0" (step S263), the operation change flag is made to "1" (step S264), an anamo-introduction routine is called for (step S265), the copy sheet number displayed at the display 101 is stored (step S266), the content in the anamo-rate memory is displayed at display 101 (step S267), and "%"-display 102 is caused to ignite (step S268).

If the margin flag represents "1" (step S271), this flag is made to "0" (step S272), the operation change flag is turned to "1" (step S273), and a margin introduction routine is called for (step S274).

If the margin reduction flag represents "1" (step S281), this flag is turned to "0" (step S282), the operation change flag is made to "1" (step S283), and the margin reduction introducing routine is called for (step S284). Then, the content of the display 101 is stored in a copy sheets number memory (step S275), and the margin size is displayed at display 101 (step S276), thereby "mm"-display 103 is caused to ignite (step S277).

Further, at the appearance of OFF-edge at interruption key 60 (steo S291), if the operation change flag represents "1" memorized copy sheets number is returned to "0" (step S293), the (step S292), this flag is returned to display 101 (step S294) and displays 102 and 103 are caused to extinguish (step S295). In other words, if the machine conditions were not in the normal mode before entrance into the said interruption mode, but in another operating mode, such as the anamo-copying mode, margin formation mode, margin-plus-automatic size reduction mode or the like, copy sheets number display area 101 shows the respective anamo-rate and margin size, as long as interruption key 61 is being depressed during an interruption release operation.

e-7-4: Margin copy mode selection key manipulations

Figure 21:
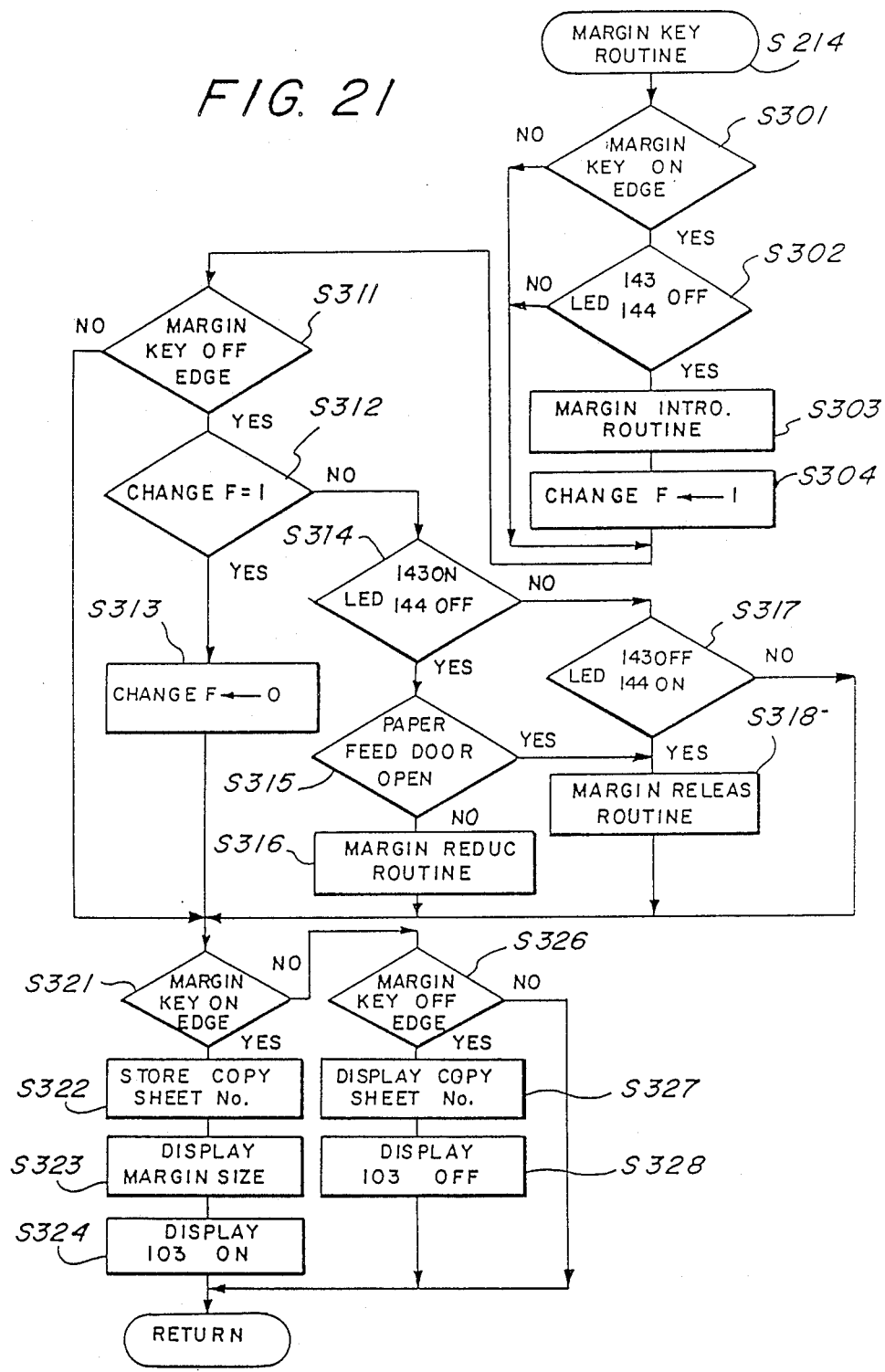
FIG. 21 is a flow chart of a sub-routine for execution of the margin copy mode selection key processing.

In FIG. 21, a margin copy mode selection key manipulation routine S214 is schematically shown. This key is nominated with 82.

With the manual paper feed door held in its closed state, if the said key 82 is made ON, a specific operational rotation: "normal mode"→"margin-forming mode"→"margin plus automatic size reduction mode"→"normal mode" is made.

On the contrary, if the manual paper feed door is held open, such a specific operational rotation: "normal mode"→"margin-forming mode"→"normal mode" is made.

At the appearance of ON-edge of margin copy mode selection key 82 (step S301), if the margin copy mode selection display LED 143 and margin-forming plus automatic size reduction mode selection display LED 144 are both OFF, or more specifically, the machine is in its normal operating state wherein no margin is to be formed (step S302), a margin introduction routine must be called for (step S303), in order to bring about the "margin-forming mode". And, the operation change flag is set to "1" (step S304).

Next, at the appearance of OFF-edge of margin copy mode selection key 82 (step S311), if the margin-forming mode has been selected (operation change flag being "1") (step S312), the operation change flag is made to "0" (step S313). When this flag represents, thus, "0", display LED 143 will ignite, while display LED 144 is extinguished. Or in other words, the mode is adjudged as a "margin-forming mode" (step S314).

In order to change the next succeeding mode into a "margin plus automatic size reduction mode", however under such condition as of the manual paper feed door, being not opened (step S315), call is made for the margin-reduction routine (step S316).

If the manual paper feed door is closed, or LED 143 is extinguished, wile LED 144 is ignited, more specifically, the state is in the "margin plus automatic size reduction mode" (step S317), a returning to normal mode without formation of the margin must be made. For this purpose, a margin release routine will be called for (step S318). In other words, when the manual paper feed door is kept open, the size of the paper to be fed-in is indeterminate and, thus, a calculation of an automatic size reduction rate could not be performed. For this reason, "margin the plus automatic size reduction mode" is cancelled.

It will be well understood that by operation of the operation change flag, a change from "normal mode" to "margin-forming mode" will be brought about with the appearance of ON-edge at the margin copy mode selection key 82 (step S321). It will be further noted that a transfer from the "margin-forming mode" to the "margin plus automatic size reduction mode" or the "margin plus automatic size reduction mode to the "normal mode" is brought about with the appearance of OFF-edge at the margin copy mode selection key 82 (step S326).

In other words, and in the case of "1" at the operation change flag, when the magnification factor-up or -down key (71; 72) is operated while holding the copy mode selection key 82 ON, for varying the scheduled margin size. In this case, a judgement is made that the margin copy mode selection key 82 was made ON exclusively for varying the margin size, and not for the purpose of the mode transfer. In fact, mode the transfer possibility has been cancelled by making the operation change flag to "1".

At the appearance of ON-edge at margin copy mode selection key 82, the content of the margin size memory is displayed at copy sheets number display 101 (steps S321 and S322), and "mm"-display 103 is ignited (step S324).

At the appearance of OFF-edge at margin copy mode selection key 82, the content in "mm"-display 103 will return to the original or foregoing copy sheets display (step S327) which appeared in advance of making the margin copy mode selection key 82 ON. Then, "mm"-display 103 will be extinguished (step S328).

e-7-5: Anamo-copy mode selection key manipulations

Figure 22:
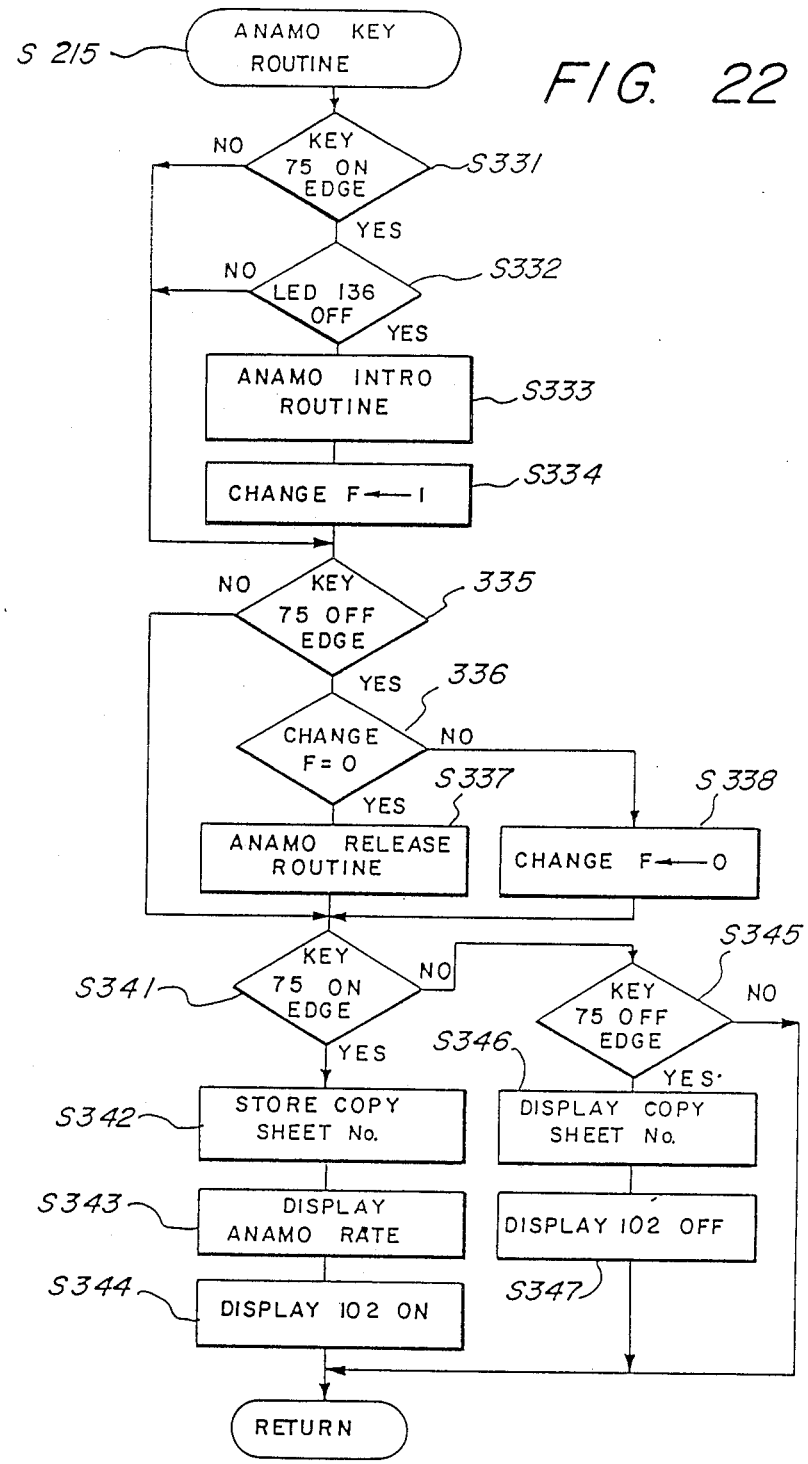
FIG. 22 is a flow chart of sub-routine for execution of the anamo-copy mode selection key processing.

In FIG. 22, an anamo-copy mode selection key manipulation routine S215 is schematically shown. This key was referred to hereinbefore with numeral 75.

With the ON-edge at anamo-copy mode selection key 75 (step S331), amino-copy mode selection display LED 136 becomes OFF. If the state is a "normal mode" (step S332), and the operation change flag (step S334).

With the OFF-edge at anamo-copy mode selection key 75 (step S335), if the operation change-flag represents "1" (step S336), a similar attitude as adopted in the case of the margin-copy mode selection key operation routine described hereinabove in e-7-4 can be taken, thus any specific operation being not done, and the operation change flag is caused to display "0" (step S338). On the contrary, if the operation change flag represents "0", an anamo-release routine is called for (step S337).

With the appearance of ON-edge at anamo-copy mode selection key 75 (step S341), the content of the anamo-rate memory is displayed at copy sheets number display 101 (steps S342 and S343), and "%"-display 102 is made ON (step S344).

With the appearance of OFF-edge at anamo-copy mode selection key 75 (step S345), display 101 returns to the former copy seets number display mode (step S346), thus showing such copy sheets number as was displayed before ON-made at anamo-copy mode selection key 75, and extinguishing the "%"-display 102 (step S347).

e-7-6: Cassette selection key manipulations

Figure 23:
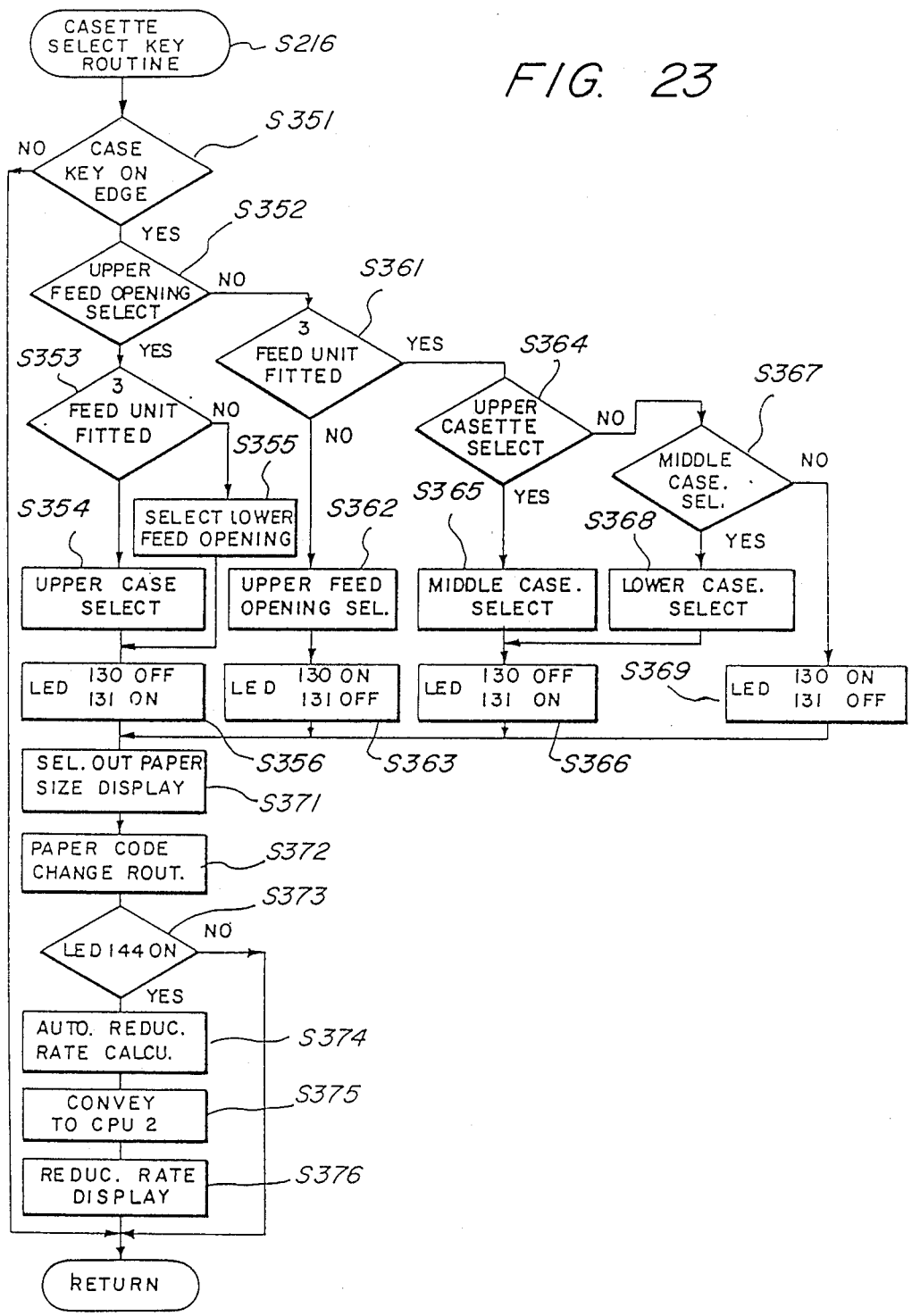
FIG. 23 is a flow chart of a sub-routine for execution of the cassette selection key processing.

In FIG. 23, a cassette selection key manipulation routine S216 is schematically shown. To this key, reference numeral 66 has been allocated hereinbefore.

By depressing the key 66, paper feed openings are successively selected out, as becoming more clear as the description proceeds.

With the appearance of ON-edge at cassette selection key 66 (step S351) and if upper paper selection LED 130 is kept igniting, or in other words, if the upper paper feed opening to the copier proper 1 has been selected out (step S352), lower the paper feed opening to the copier proper 1 is selected out (step S355). If, in this case, the optional three-stage paper feed unit 1000 has been fitted to (step S353), the uppermost cassette is selected out (step S354). Then, display LED 131 is ignited, while display LED 130 is extinguished (step S356).

When display 130 is not ignited and display LED 131 is ignited, and if the three-stage paper feed unit 1000 has not been fitted (step S361), upper the paper feed opening to the copier is selected (step S362). And, display LED 130 is ignited and display LED 131 is extinguished (step S363).

If the three-stage paper feed unit 1000 has been fitted to, a middle stage paper feed is allocated (step S365) to upper stage selection instructed (step S364) or otherwise lower stage paper feed is allocated (step S368) to middle stage selection instructed, while display LED is being held ignited (step S366).

When a lowermost stage selection is required, selection is made for the upper stage to copier proper 1, and display 130 is ignited (step S369).

As a further step, a display is made for the selected-out paper size (step S371). In this respect, reference may be made to the disclosure to be set forth in the next following item: e-7-7.

Next, a paper code change routine is called for (step S372).

Further, in the case of display LED 144 held ignited, showing a selection for the "margin plus automatic size reduction mode (step S373), calculation is made for an automatic size reduction rate (step S374) relative to the newly selected-out paper size, and the resulting rate will be transmitted CPU2 (step S376) for a display thereof (step S376).

Figure 24:
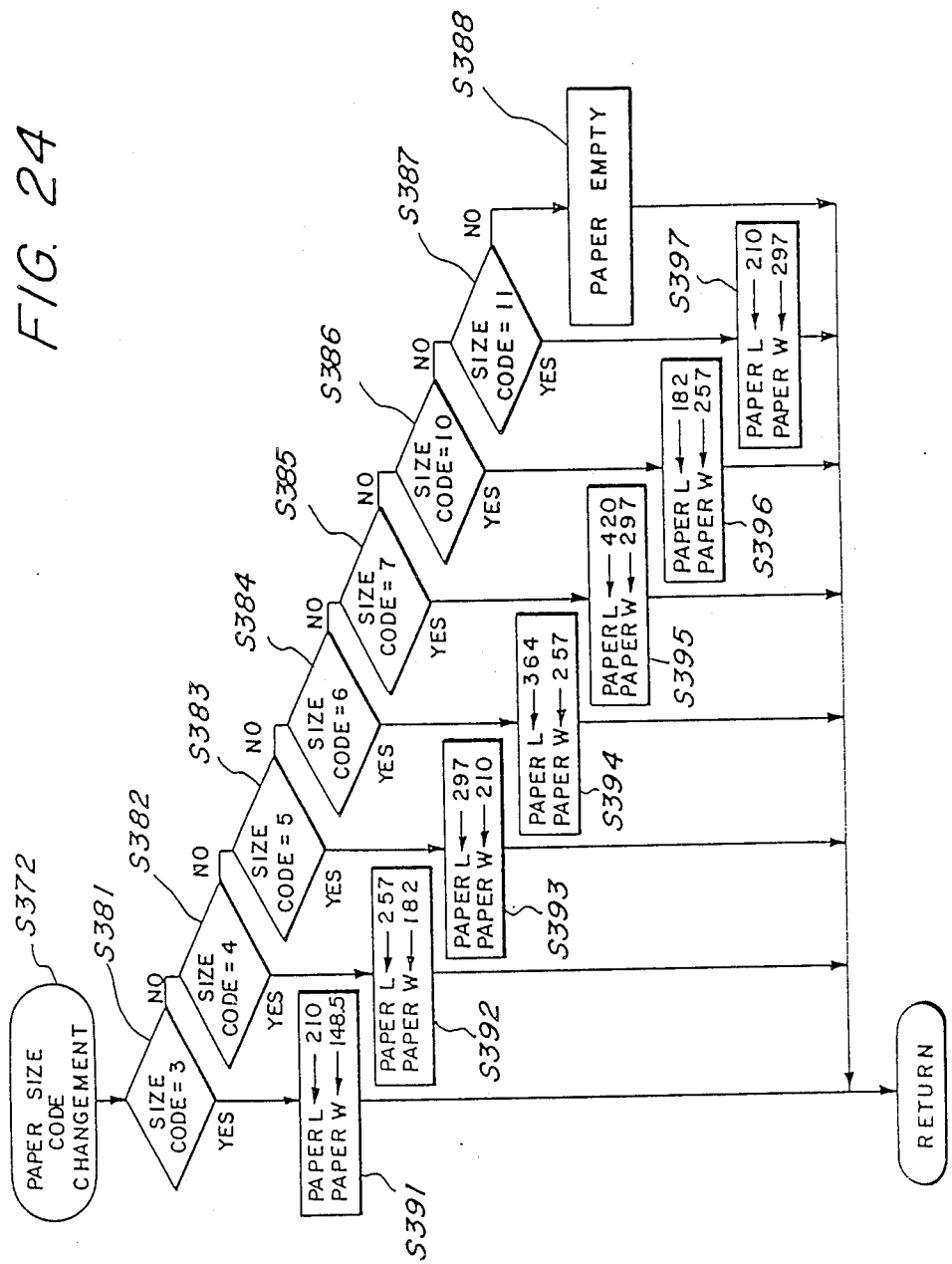
FIG. 24 is a flow chart of a sub-routine for execution of the paper size change processing.

In FIG. 24, a paper size code changement routine is schematically shown.

Paper sizes are classified and coded as 3-11, as shown.

If the input paper size code is "3" (step S381), it represents "A5 format, longitudinal". Paper length: 210 mm; paper width: 148.5 mm. These data are memorized (step S391). Further data and steps are enlisted below:

| Code | Step | Format |
| --- | --- | --- |
| 4 | S382 | B5, longitudinal |
| 5 | S383 | A4, longitudinal |
| 6 | S384 | B4, longitudinal |
| 7 | S385 | A3, longitudinal |
| ... | | |
| 10 | S386 | B5, lateral |
| 11 | S387 | A4, lateral |

In these cases, respective paper length and paper width are memorized (steps S392-397). If none of these code data is introduced, it is adjudged that there is no paper (step S388).

e-7-7: Book copy mode selection key manipulations

In FIG. 25, book copy mode selection key manipulation routine S217 is schematically shown.

In this case, if ON-edge is not appearing at book copy mode selection key 83 (step S401), the state as such will be subjected to a return operation.

With ON-edge, however, and in the case of ADF-use, or in other words, if a document is set in position on the document feed tray (step S402), the book copy mode can not be accepted and thus the state will also be subjected to return. Further, if display 112 is ignited, in other words, if the manual feed door is opening (step S403), the state will be subjected to return.

If book copy mode selection display LED 145 is extinguished, thus showing no book copy mode being scheduled (step S411), this LED 145 is ignited (step S412) and an A-page copy signal is made "0" (step S413) for introducing the second controller CPU2 to make scanning from the B-page at first (step S413) by setting the B-page copy signal to "1" (step S414).

When it is desired to cancel the book copy mode (step S411) if the book copy mode selection display LED 145 is held igniting (step S411), the LED 145 is extinguished (step S416) and the A-page copy signal and the B-page copy signal are both made to "0" (steps S417; S418).

e-7-8: Automatic exposure by key manipulation routine

Figure 26:
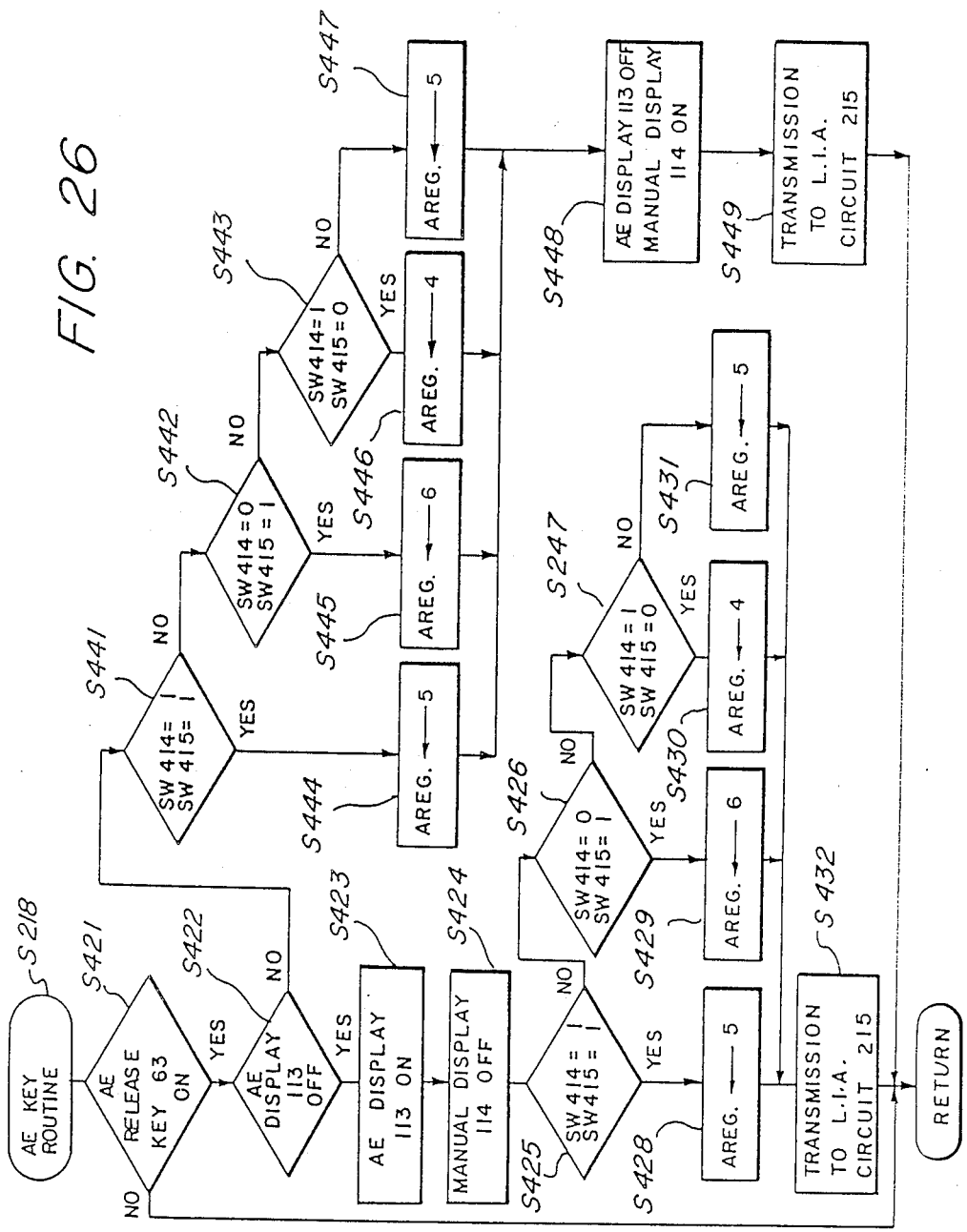
FIG. 26 is a flow chart of a sub-routine for execution of the automatic exposure key processing.
Figure 34A:
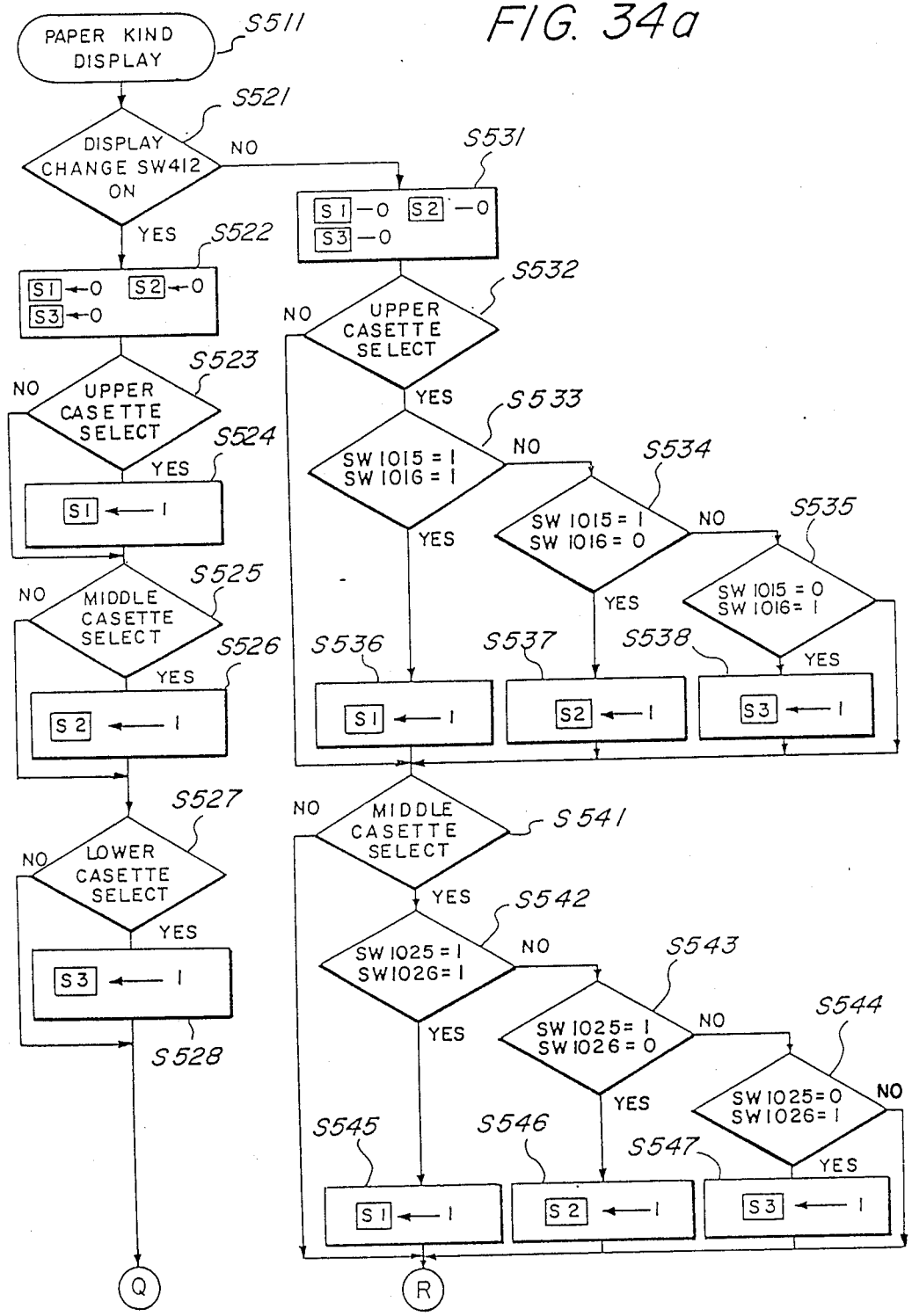
FIGS. 34A and 34B are a flow chart of a sub-routine for execution of the paper kind display process.
Figure 34B:
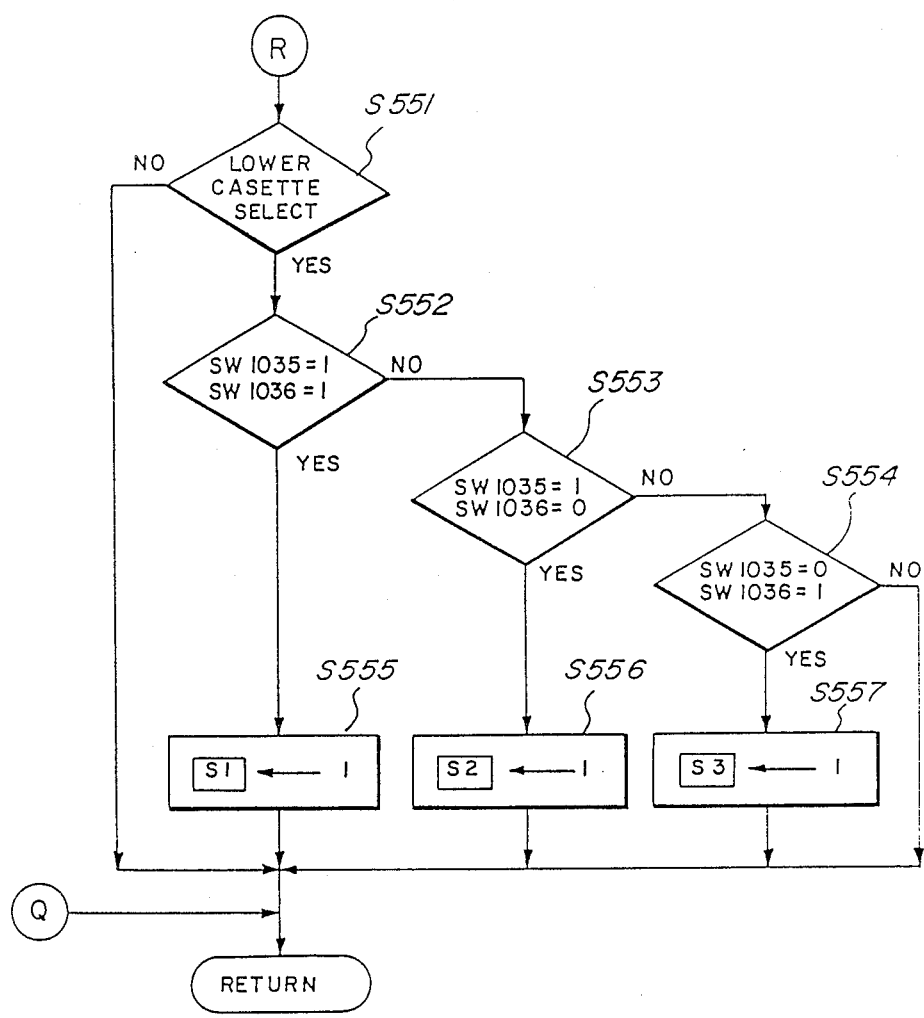

In FIG. 26, automatic exposure key manipulation routine S218 is shown schematically.

If automatic exposure display 113 (AUTO) is extinguished, operate automatic exposure selection release key 63 is made ON. Then, the said display will ignite, while the manual exposure step display is caused to extinguish.

Further, with combined operation of switches 414 and 415, a mean value destined for the automatic exposure control is transmitted to light intensity adjuster circuit 215.

On the contrary, when a release of the automatic exposure is required, control must be made of the manual value available upon execution of the automatic exposure release and by joint manipulation of said both switches 414 and 415.

More specifically, at first, ON or OFF position of the automatic exposure selection release key 63 is adjudged (step S421). If not ON, the state is subjected to return.

If the key 63 is ON, extinguishment or not of automatic exposure display 113 is adjudged (step S422). If extinguished, the display 113 is ignited (step S423), while the manual step display 114 is extinguished (step S424). Then, the mean central value for the automatic control is stored in the A-register by a execution of joint operation of switches 414 and 415 (step S425-431) and this value will be transmitted to light intensity adjuster circuit 215 (step S432).

If automatic exposure display 113 is held igniting (step S422), manual value of exposure control is stored in A-register by joint manipulation of switches 414 and 415 (step S441-447). With this value, manual exposure step 11 is caused to ignite, while automatic exposure display 113 is caused to extinguish (step S449).

e-7-9: Margin-introduction, margin-reduction introduction and margin-release sub-routines In FIGS. 27-29, said sub-routines for execution of three control modes of the margin are shown.

Margin-introduction sub-routine S303 shown in FIG. 27 represents a sub-routine for execution of a change-over from "normal mode" to "margin-formation mode".

At first, margin copy mode selection display LED 143 is ignited (step S451). Then, the memorized margin size data are transmitted to second controller CPU2 (step S452).

Margin-reduction introducing routine S316 shown in FIG. 28 represents a sub-routine for execution of change-over operation from "margin-forming mode" to "margin plus automatic size-reducing mode".

At first, margin copy mode selection display LED 143 is caused to extinguish (step S461), while margin-forming plus automatic size-reducing mode selection display LED 144 is ignited (step S462). Then, magnification factor selection display LEDs 132-135 and zoom magnification factor display LEDs 139-142 are caused to extinguish (step S463). Further, memorized margin size data are transmitted to second controller CPU2 (step S464). At this time, the copy magnification factor selected out by manipulation of the magnification key is stored so as to later execute a return operation necessary for a future mode release (steps S465; S466).

Next, based upon paper length and scheduled margin size, and by reliance of an automatic size reduction rate calculation routine to be described, calculation is made to determine the "dropoutless image formable magnification factor" and the thus related data are transmitted to second controller CPU2 (step S468). This magnification factor is also displayed (step S469).

In FIG. 29, margin release routine S318 is schematically shown. This is a sub-routine for the change-over manipulation from the "margin plus automatic size reduction mode".

At first, margin copy mode selection display LED 143 is caused to extinguish, while the "margin-forming plus automatic size reduction mode selection display LED 144 is ignited (steps S471; S472). Displays at magnification factor selection keys 67-70 are subjected to return (step S473). And, memorized data of the copy magnification factor are also subjected to return (step S474). To second controller CPU2, margin data (equal to "0") and the copy magnification factor are transmitted (steps S475; S476). Copy magnification factor display 118 is also subjected to return (step S477).

e-7-10: Sub-routines for anamo-introduction and anamo-release manipulations

In FIGS. 30 and 31, sub-routines for execution of anamo-controls are schematically shown.

In the case of anamo-introduction routines S333, shown in FIG. 30, it corresponds to such a sub-routine as for change-over manipulation from "normal mode" to "anamo-copy mode".

At first, anamo-copy mode selection display LED 136 is caused to ignite (step S481), while all the selected-out magnification factor display LEDs 132-135 and 139-142 are distinguished (step S482). Selected-out magnification rate key data and the copy magnification factor are memorized for later use and later return as may be necessary in a future mode release manipulation (steps S483; S484).

Next, calculation is made to obtain a product: copy magnification rate $\times$ anamo-rate (step S485). Then, this calculated product value is transmitted to second controller CPU2 (step S486) for use as scanner speed data. Therefore, the scanning can be performed at a speed calculated from the former magnification rate and the presently specified anamo-rate.

The anamo-release routine, shown in FIG. 31 corresponds to the sub-routine for a reversed change-over manipulation from the "anamo-copy mode" to "normal".

At first, anamo-copy mode selection display LED 136 is caused to distinguished (step S491), and the display at the selected magnification rate key and memorized in the anamo-introduction routine shown in FIG. 30 and the copy magnification rate are caused to return (steps S492; S493). Further, data of the copy magnification rate is transmitted to second controller CPU2 (steps S494).

e-7-11: Automatic reduction rate calculation procedures

In FIG. 32, automatic size reduction rate calculation routine S374 is schematically shown.

In this routine, calculation is made to obtain the value equal to (paper length minus margin size) divided by (paper length × copy magnification rate) (steps S501–S503).

e-8: Display manipulations

In FIG. 33, display manipulation routine is schematically shown.

As shown in the flow chart, there are several different sub-routines to be called for successive executions of paper kind display (step S511); door position display (step S512); color toner display (step S513); book alarm display (step S514); and anamo-alarm display (step S515).

e-8-1: Paper kind display

Jointly in FIGS. 14(a) and 14(b), paper kind display routine S511 is schematically shown.

Display modes expressed at three displays S1; S2 and S3, and generally illustrated hereinbefore by reference numeral 121 also in FIG. 2(a), correspond to those of the respective uppermost, middle and lowermost paper feed openings of three stage paper feed unit 1000, if display mode change-over switch 412 is ON.

On the contrary, if the change-over switch 412 is OFF, the display mode is such a paper kind display one which has been brought about by manipulation of paper kind set switches 1015; 1016; 1025; 1026; 1035 and 1036.

It should be noted at the present stage of disclosure that the term "paper kind" represents that which is determined and classified by colors, thicknesses, surface roughnesses and the like factors of the paper, although not further and specifically set forth herein, yet being effective throughout the specification and appended claims.

When display mode change-over switch 412 is held ON (step S521), displays S1; S2 and S3 of the display unit 121 are caused at first to extinguish (step S522), and the first display S1 is caused to ignite (step S524), if the uppermost paper cassette of the three stage paper feed unit has been selected out (step S523). If, however, the middle paper cassette has been selected out (step S525), the second display S2 is caused to ignite (step S526). Or alternatively, if the lowermost paper cassette has been selected out (step S527), the third display S3 is caused to ignite (step S528).

When display mode change-over switch 412 is held extinguished, thus showing a paper kind display wanted, all the three displays at S1; S2 and S3 are caused to be extinguished (step S531). If the middle cassette of the three stage paper feed unit has been selected out (step S541), displays at S1; S2 and S3 are invited (steps S536; S538) by execution of joint manipulation of paper kind set switches 1025; 1026 (steps S542; S544). If the lowermost paper feed cassette has been selected out (step S551), displays at S1; S2 and S3 are invited (steps S555–S557) by execution of joint manipulation of paper kind set switches 1035; 1036 (steps S552–S554).

e-8-2: Door position display

Figures 35, 36:
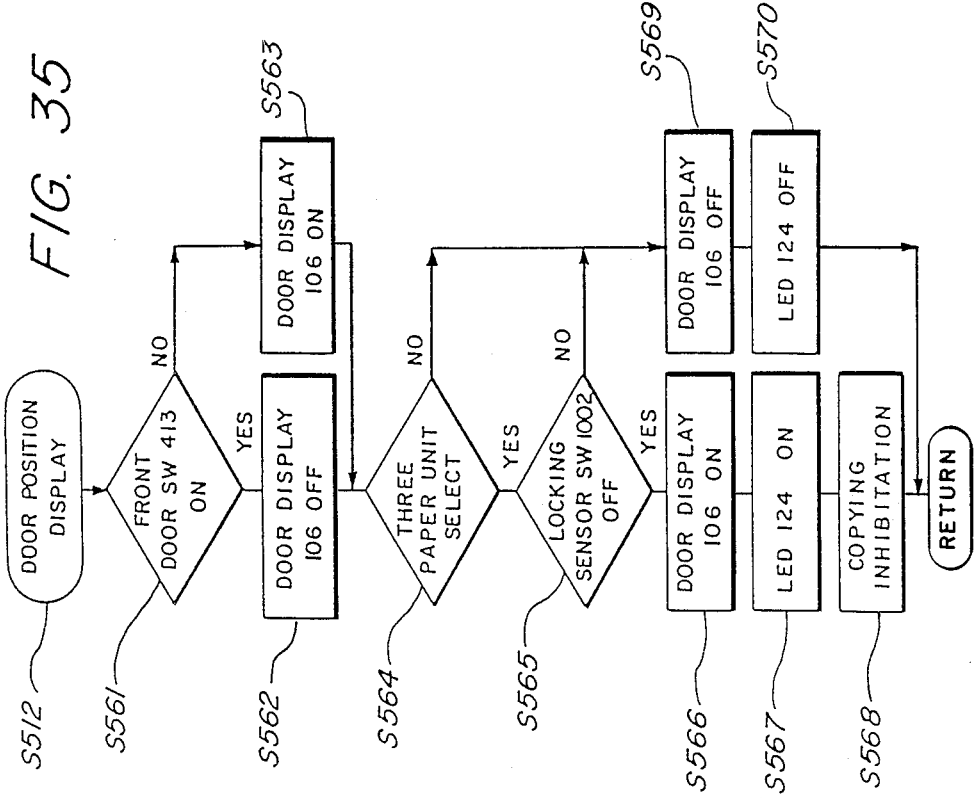
FIG. 35 is a flow chart of a sub-routine for execution of the door position display processing.
FIG. 36 is a flow chart of a sub-routine for execution of the color toner display processing.

In FIG. 35, door position display routine S512 is schematically shown.

When front door sensor switch 413 of the copier proper 1 is held OFF (steps S561), door display 106 is caused to ignite (step S563). On the contrary, when the sensor switch 413 is held ON, said door display 106 is caused to extinguish (step S562).

Next, when the paper feed openings of the three stage paper feed unit 1000 have been selected (step S564), and if a signal denoting that docking sensor switch 1002 is in the OFF-state, which means that the said three stage paper feed unit 1000 is remote from the copier proper 1, is transmitted from a fourth controller CPU4 (step S565), door display 106 is caused to ignite (step S566), and monitor LED 124 is also ignited (step S567). Thus, an appropriate portion of monitor 123, relates with the three stage paper feed unit 1000. Copying operation is naturally inhibited (step S568). Even if the three stage paper feed unit has not been selected out (step S564) or otherwise, only if docking sensor switch 1002 is held ON (step S565), door display 106 and monitor display LED 124 are caused to extinguish (steps S569; S570).

e-8-3: Color toner display

In the present routine S513, when a developer device filled with any other developing agent than standard toner (black one) is set in position, color toner display 117 is caused to display.

Certain conventional copier machines capable of executing a monotone color photo-copying job, when fitted with a color developer unit, a seal means fitted thereon is visible through a window formed on the machine front door to the machine operator for identification thereof.

Other conventional copier machines are provided on the manipulation panel with color display means for a similar purpose as above (refer to, for instance, Japanese Open Patent Specification No. Sho-59-53867).

Experience has provided that in the former, outside lights may invade into the machine interior. On the other hand, the latter type copier machines may frequently show a substantial increase in the manufacturing cost.

In the photo-copiers which are mainly responsible for black copying jobs, it may be rather recommended to fit such means as adapted for displaying only the black color copying or not. With this means, the user can well prevent an occurrence of mis-copying operation. It should also be noted that the above measures, if adopted, will invite a substantial cost reduction.

In FIG. 36, color toner display routine S513 is schematically shown. Magnet means are provided on color toner developing device, although not specifically shown, wherein, however, kinds of color may be disregarded. When sensor switch 44 turns ON under the action of the above magnet means (step S581), color toner display 117 is caused to ignite (step S582). In another case where a black toner developer should have been used, said color toner display 117 is caused to extinguished (step S583).

e-8-4: Book alarm display

Figure 37:
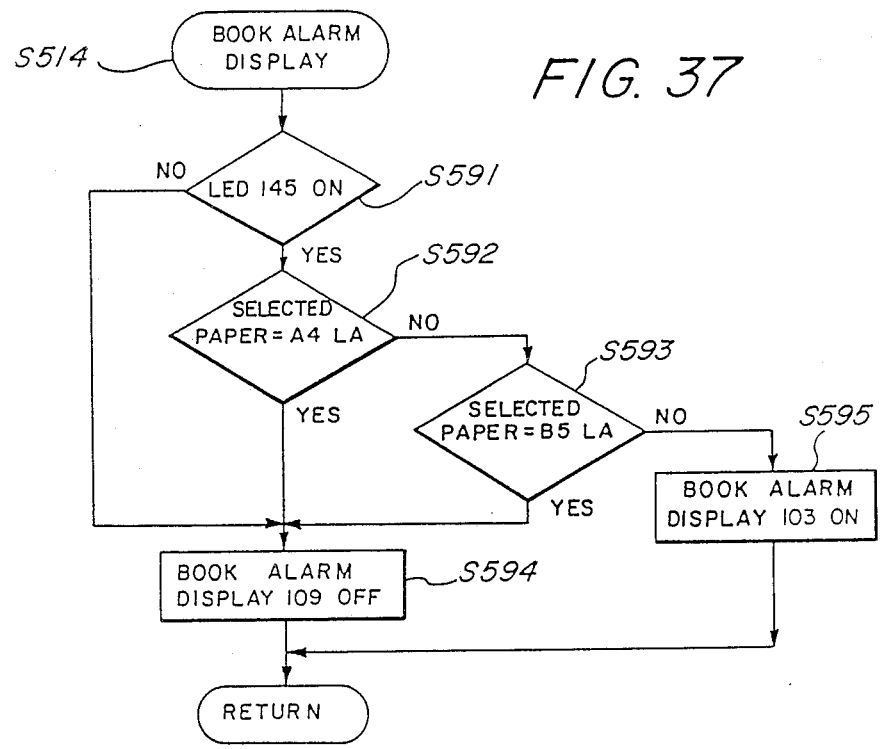
FIG. 37 is a flow chart of a sub-routine for execution of the book alarm display processing.

In FIG. 37, a book alarm display routine is shown schematically.

In the ON-state of book copy mode selection display LED 145, showing a book copy mode being selected out (step S591) and in such case where the selected paper format is other than A4, lateral, and B5, lateral (steps S592; S593), a book copying operation could be made, resulting, however, in incomplete photo-copies only. The reason will be apparent. Two open-out successive pages of a book used as the document are placed on the transparent plate of the copier proper naturally in lateral relative to the paper travel route. According to our standard copier machine specifications, the maximum dimension of the transparent plate amounts to 420 mm. When the papers of A4-format are passed below the window glass longitudinally as usual, photo-images appearing on a paper sheet will include part of another book page. For display of this defective photo-copying, book alarm display 109 is caused to ignite (step S595).

On the contrary, if the photo-copying operation is in another mode than the book-copying one, or if the practically used paper format is A4-lateral or B5-lateral, the photo-images will be perfectly and completely reproduced. In these cases, the display 109 is naturally caused to distinguish (step S594).

e-8-5: Anamo-alarm display

Figure 38:
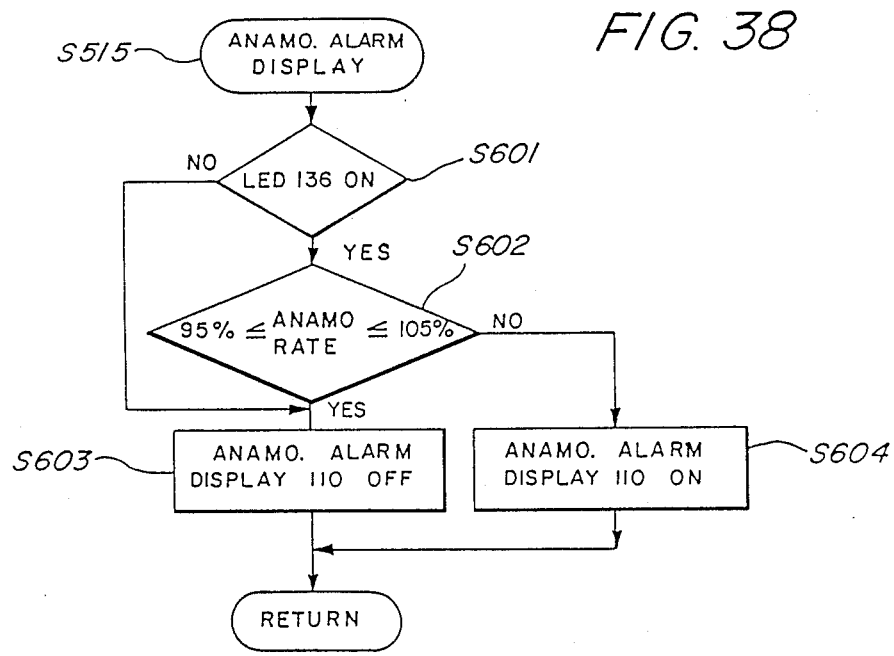
FIG. 38 is a flow chart of a sub-routine for execution of the anamo-alarm display processing.

In FIG. 38, anamo-alarm display routine S515 is shown schematically.

With anamo-copy mode selection display LED 136 held igniting, thus the anamo-copy mode being selected out (step S601), and if the selected-out anamo-rate is other than 95-105% (step S602), the image resolution will become too poor to be accepted. For this reason, anamo-alarm display 110 is ignited (step S603).

Within such range of an anamo-rate as 95-105%, the display 110 will not be ignited.

(f) Operations of the optical system

Figure 42A:
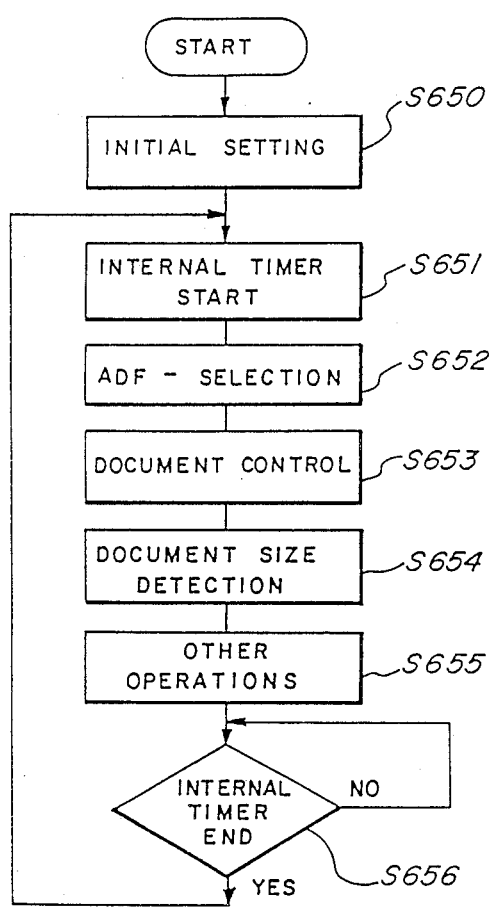
FIGS. 42(A) and (B) jointly illustrate a flow chart of the main routine of a program for the control of a microprocessor CPU3 adapted for controlling an automatic document feeder (ADF) employed.

Jointly in FIGS. 39(A); 39(B)–FIGS. 42(A); 42(B), an operation program of second controller CPU2 as expressed in a flow chart is shown. This second controller is so designed and arranged to control the operation of the optical system, or more specifically adapted for scanner- and lens-control.

In the main routine shown in FIG. 39(A), upon execution of an initial setting (step S611), an inside timer is caused to start (step S612). Next, a lens control (step S613) (more in detail, refer to FIG. 41) and a scanner control (step S614) (more in detail, refer to FIG. 42) are caused to execute. With the termination of the time limit of the inside timer, it is adjudged that one routine operation has been completed (step S615). Then, the state returns to step S612.

As shown in FIG. 39(B), if there is an interruption from the side of first controller CPU1 (step S616), communication will be made therewith (step S617).

In FIG. 40, lens control routine S613 is shown schematically.

In the case of a normal copy mode (step S621), the lens is subjected to a positional movement (step S623) so as to meet with the copy magnification data transmitted from first controller CPU1.

With anamo-copy mode selection display LED 136 held igniting (step S621), or in other words, in the case of a "anamo-copy mode", the lens is not moved to the specifically specified magnifying position, as was instructed by data instructions transmitted to from the first controller CPU1. But, the lens movement is made to the true-size or unit magnification lens position (step S622).

The term "amano-copy mode" as herein adopted and specifically used in the present embodiment means such that while the lens is being fixedly positioned adapted for effectively with its normal copy-magnification rate, the scanning speed is properly modified so as to obtain a longitudinally polarized magnification factor as wanted.

Figure 41:
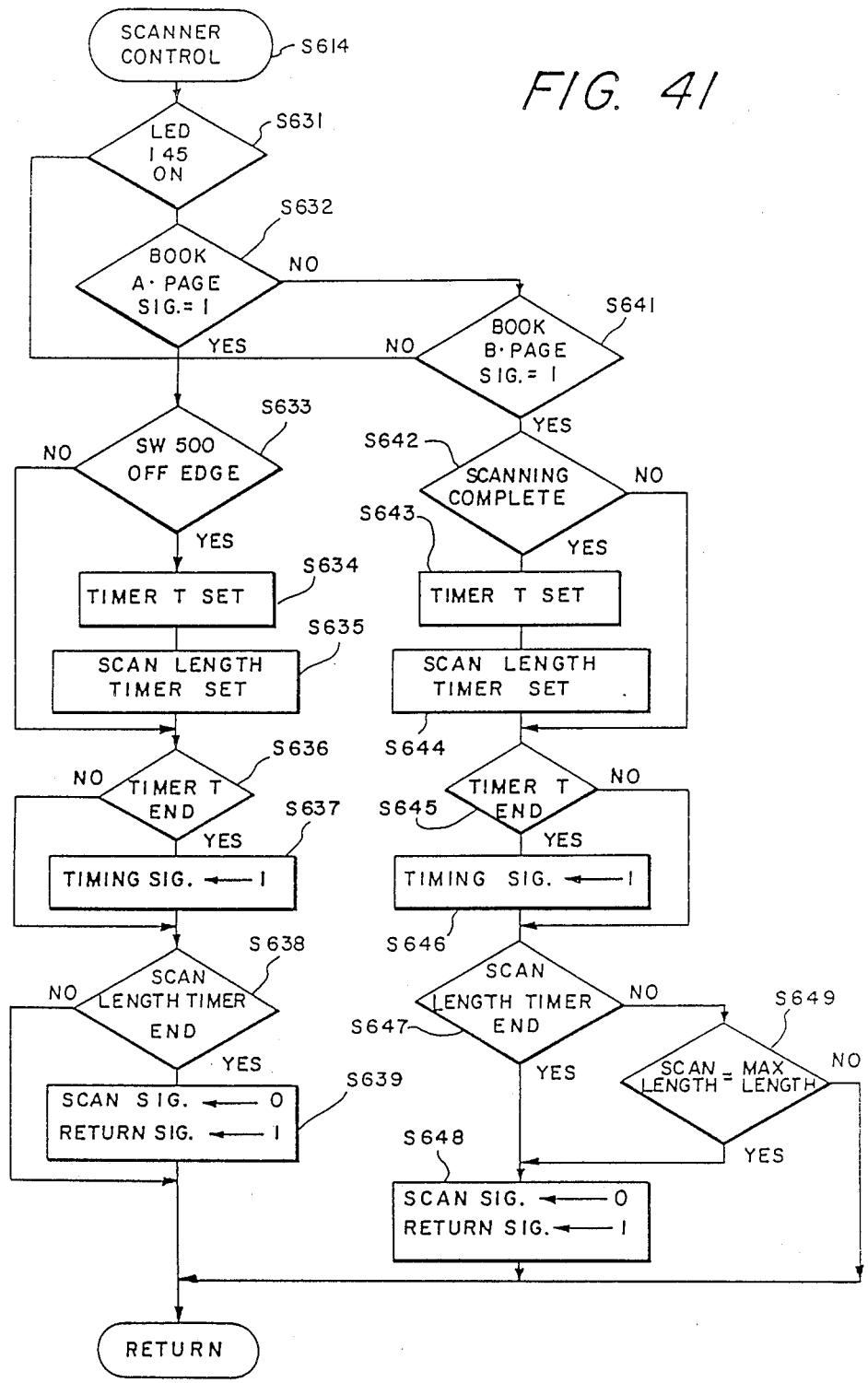
FIG. 41 is a flow chart of a sub-routine for execution of the scanner control processing.

In FIG. 41, scanner control routine S614 is schematically shown.

With display LED 145 being unignited (step S631), or in other words, in the case of the normal copy mode, or alternatively, under ignition state of the LED 145 (in the case of book copy mode) and in case of scanning of the A-page (step S632), the regular scanner control operation is performed. Or in other words, if the scanner leaves its definitely specified position SW (SW500) (step S633), timer T is provided for making registration with the paper in consideration of the scanning speed; and a further time called scan length timer is defined by a product: paper length × magnification rate, are both brought into setting (steps S634; S635).

With termination of the time limit at the timer T (step S636), the timing signal is turned to "1" (step S637) and with termination of the time limit at the scan length timer (step S638), the scan signal is made to "0", and the return signal is set to "1" (step S639).

In the case of B-page scanning (step S641), and upon performance of scanning just by such a length equal to paper length × magnification rate or in other words, upon travel through a definite length corresponding to the range of the A-page of the book serving as document (step S642), similar operations as are set forth hereinabove are executed (steps S643-648).

If, however, in advance of the completion of time limit at the scan length timer, the scanner should reach the maximum length (420 mm), the scanning operation is forcibly caused to terminate (step S649), and a return operation will be brought about.

(g) ADF-operations

Jointly in FIGS. 42(A) and (B), a schematic flow chart for control of the third controller CPU3 controlling in turn ADF-300.

When the CPU3 has been reset and the program starts, an initial setting is brought about to bring the CPU to its initialized state for clearing the RAM and for setting various registers and the like and to bring various attributed devices to their initial states (step S650).

Next, an inside timer contained in the CPU3, and the time limit thereof being preset by the aforementioned initial setting, is caused to start (step S651).

Further, several sub-routines for ADF-selection (step S652); document control (step S653); document size detection (step S654) and several other operations (step S655) are successively called for.

All of said sub-routine operations have been completed and the termination of time limit set firstly at the inside timer, one complete routine will come to end (step S656). By use of the this one routine time period, counting jobs are performed at various timers appearing in said various sub-routines. Specific time limit destined for each of these timers are counted based upon the number of repeated cycles of the complete routine.

Figure 42B:
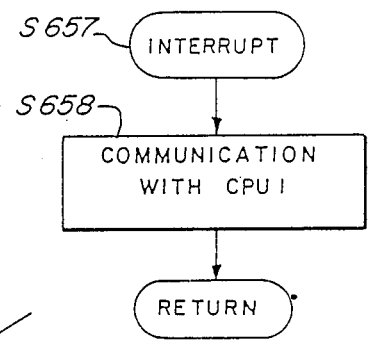

Further, as shown in FIG. 42 at (B), it may be well understood that the data communication with first controller CPU1 (step S658) will be executed, when there be a demand of interruption from the side of the said first controller (step S657), in accordance of the interruption routine, and regardless of the main routine.

Figure 43:
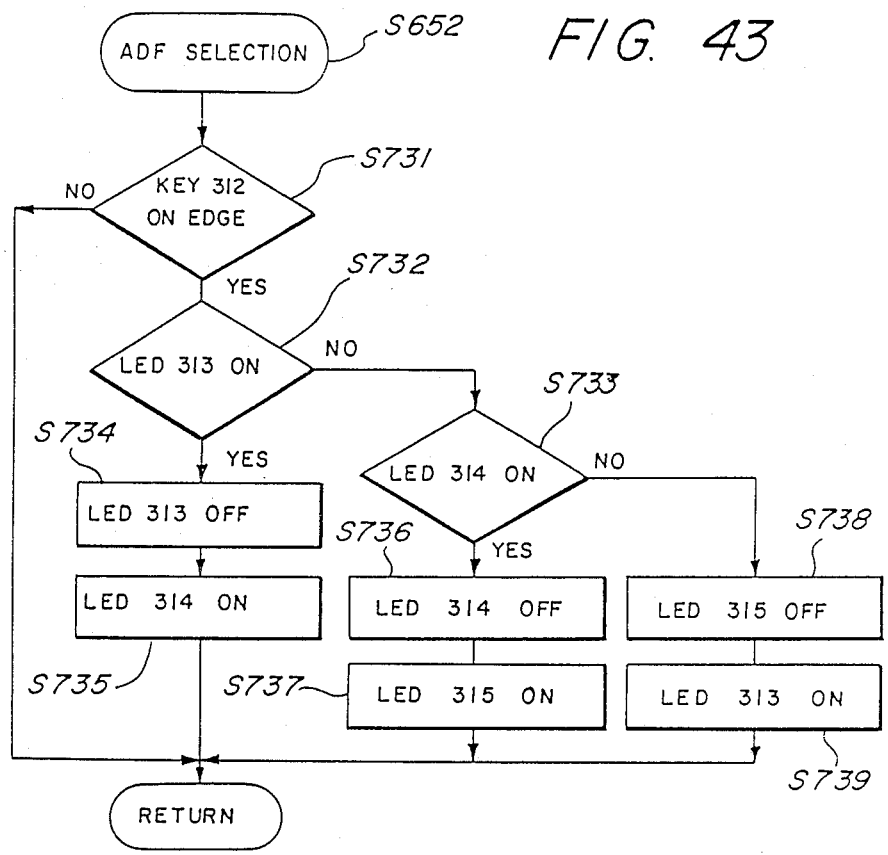
FIG. 43 is a flow chart of ADF-mode selection routine employed.

In FIG. 43, ADF-mode selection routine (S652) is schematically shown.

When appearance of ON-edge at mode change-over key 312 is sensed (step S731), if APS-mode display LED 313 is ignited or not (step S732); if AMS-mode display LED 314 is ignited or not (step S733) is adjudged.

If APS-mode display LED 313 is sensed as being ignited (step S732), thus LED 313 is caused to extinguish step S732, while AMS-mode display LED 314 is caused to ignite (step S735).

In the case of AMS-mode LED 314 being held igniting (step S733), LED 314 is caused to extinguish (step S736), while manual mode display LED 315 is caused to ignite (step S737).

If LED 313 and LED 314 are both in an extinguished state, or in other words, if manual mode display LED 315 is held igniting (step S733), LED 315 is caused to extinguish (step S738), while APS-mode display LED 313 is caused to ignite (step S739).

Figure 44:
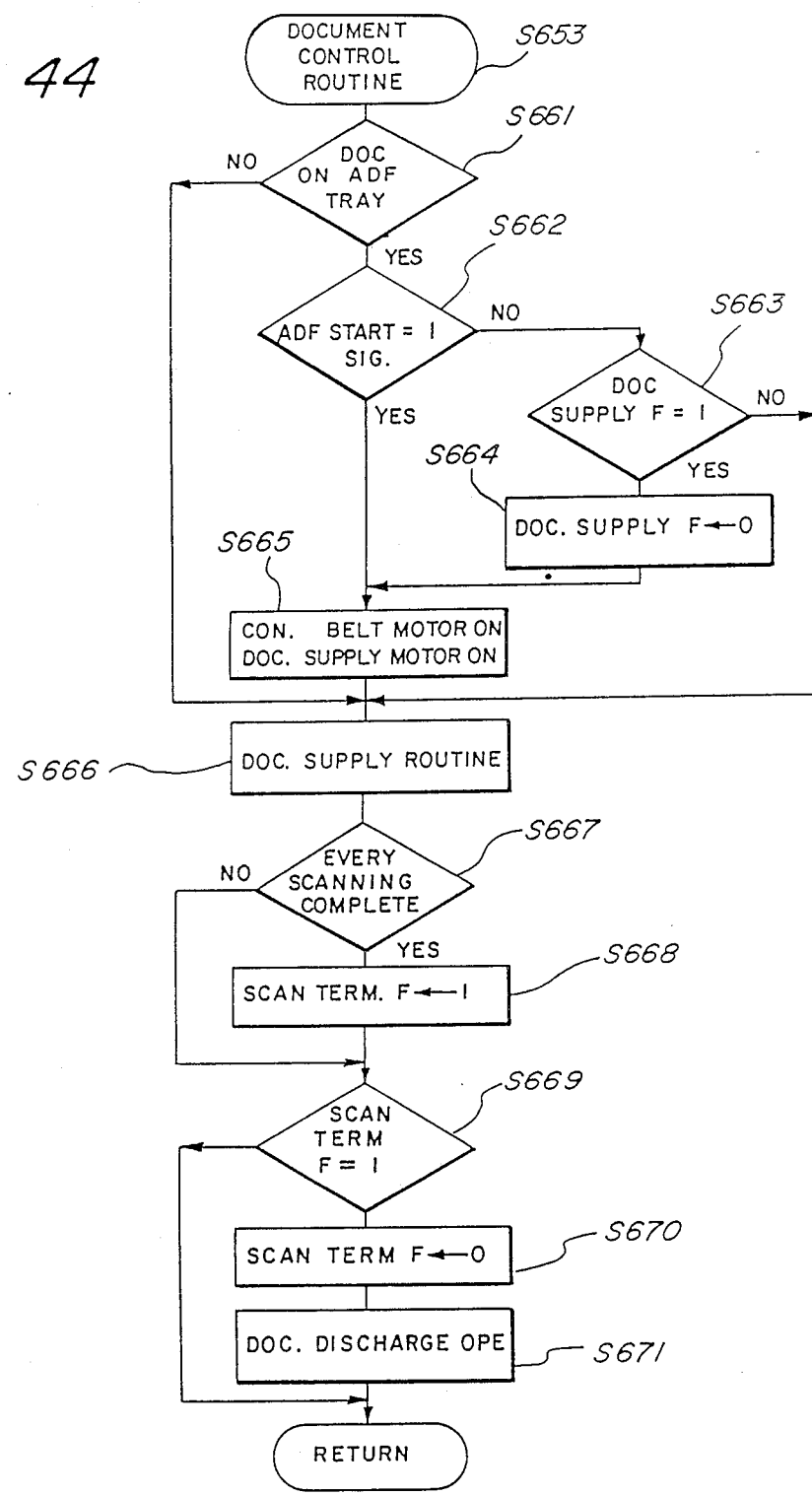
FIG. 44 is a flow chart of a sub-routine for execution of the document control processing.

In FIG. 44, document control routine S653 is schematically shown.

If there is a document on the document tray, with the document-sensing sensor 311 held ON (step S661) and when ADF-start the signal coming from CPU1 becomes "1" (step S662), or alternatively the document supply flag becomes "1" (step S663), the document supply flag is turned to "0" (step S664); conveyor belt motor 301 is made "ON" and document supply motor 302 is made ON (step S665).

Next, processing is made in accordance with the document supply routine (step S666); complete repeated number scanning operation depending upon the number of supplied paper sheets (step S667); and turn the scan termination flag to "1" (step S668).

If appearance is seen of "1" at the scan termination flag (step S669), turn the flag to "0" and then, the document discharge operation routine is called for (step S671).

Figures 45, 46:
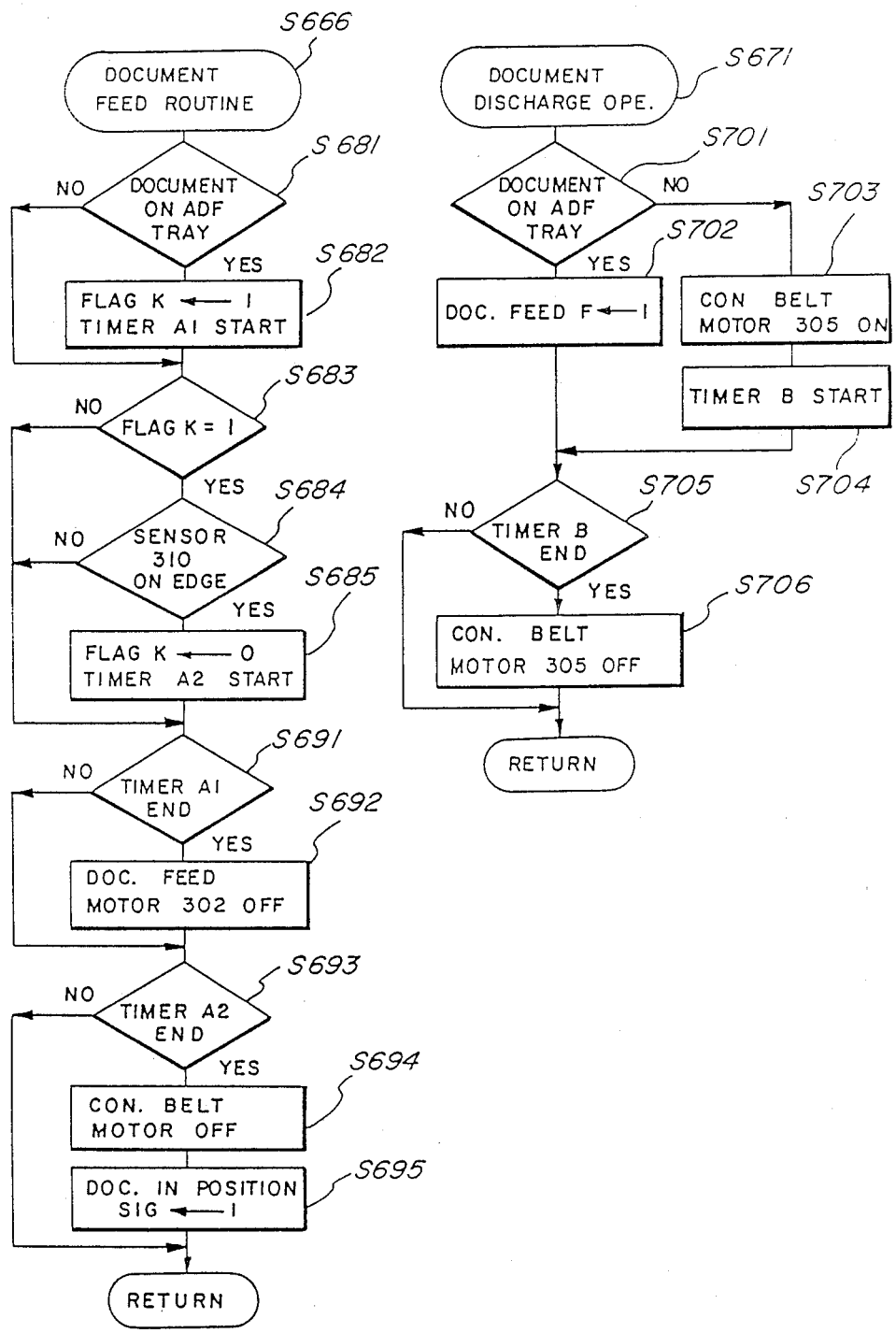
FIG. 45 is a flow chart of a sub-routine for execution of the document feed processing.
FIG. 46 is a flow chart of a sub-routine for execution of the document discharge processing.

In FIG. 45, document supply processing routine S666 is schematically shown.

When the document has been supplied and document supply sensor 310 is made ON (step S681), the flag K is turned to "1" and timer A1 is caused to start (step S682). This timer A1 acts in such a way that it prevents an unwanted feed of the next succeeding document upon the completion of the foregoing document feed, by properly stopping the document feed motor 302. For this purpose, the timer A1 has such a time limit corresponding to the necessary time length period which is to be consumed until the document will arrive at a position ready for being carried by and on conveyor belt 305.

Still further, when the flag K is held to display "1" (step S683) and with the appearance of OFF-edge at document feed sensor 310 or more specifically in other words, when the rear edge of the document is sensed (step S684), flag K is turned to "0" to start timer A2 (step S685).

Time limit of timer A2 is set to the time length which is to be consumed by the document's travel until the end of the document arrives at the effective forward end of the window glass.

At the completion of the time limit present in timer A1 (step S691), document feed motor 302 is caused to stop (step S692). At the termination of the time limit preset in timer A2 (step S693), conveyor belt motor 301 is caused to stop (step S694). Then, the document-in-position signal will be conveyed to first controller CPU1 (step S695).

In FIG. 46, document discharge processing routine S671 is schematically shown.

If it is sensed by document sensing sensor 311 that there remains the next following document in the document tray (step S701), the document feed flag is turned to "1" (step S702). If there is no document in the tray, conveyor belt motor 305 is caused to run in the regular direction (step S703) and timer B is caused to start (step S704).

The timer B has been set to have such a time limit for allowing a longest possible document on the transparent plate to be effectively discharged. With termination of the time limit at the timer B (step S705) conveyor belt motor 301 becomes OFF (step S706).

Figure 47:
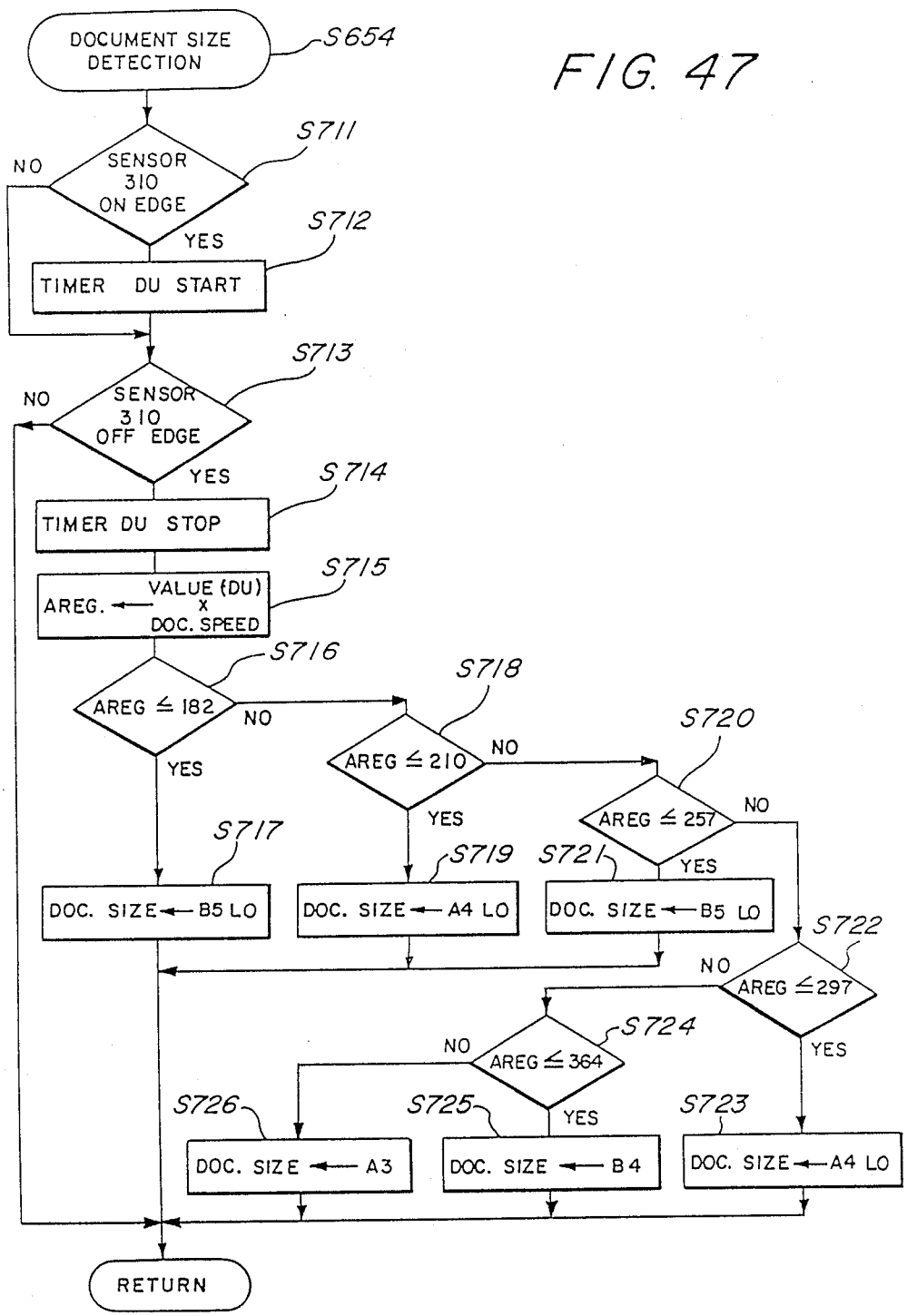
FIG. 47 is a flow chart of a sub-routine for execution of the document size sensing processing.

In FIG. 47, a document size detection routine is schematically shown.

With the appearance of ON-edge at document feed sensor 310 (step S711) the timer DU is caused to start (step S712).

On the other hand, with the appearance of OFF-edge at the same sensor 310, showing that the document end passed through the destined position (step S713), timer DU is caused to stop (step S714), and a value showing the currently appearing document length as determined by the time limit thereat multiplied by the document-conveying speed, is stored in the A-register (step S715). If the stored value in the A-register is less than 182 mm (step S716), the document size is adjudged to be B5-lateral (step S717). If the stored value is less than 210 mm (step S718), the document size will be adjudged to be A4-lateral (step S719). Further, if the stored value is less than 257 mm (step S720), the format is adjudged B5-longitudinal (step S721). If, further, the value is less than 297 mm (step S722), the format will be A4-longitudinal (step S723).

If less than 364 mm (step S724), B4 will be adjudged to (step S725). If the stored value exceeds 364 mm, the format will be adjudged as A3 (step S726).

In the foregoing embodiment, the inhibition of combination of ADF 300 with the book copy mode was made exclusively by reliance of judgement in the document feed tray of ADF 300 or not. If, however, wanted, the desired prohibiting judgement can be made in combination of the foregoing with the open/close position of ADF 300, as being sensed at sensor switch 309 (refer to the imaginary line shown in FIG. 1).

In FIG. 48, a modified embodiment of the book copy mode selection key operation routine is shown.

At no appearance of ON-edge at book copy mode selection key 83 (step S801), the proceeding must be advanced to step S809. The ON-edge is sensed; book mode selection display LED 145 is extinguished to show the mode being other than book copy mode (step S802); then, this LED is caused to ignite (step S803).

In order to instruct the second controller CPU2 to perform scanning from the side of the B-page, set A-page copy signal to "0" (step S804), while B-page copy signal is set to "1" (step S805). Then, book copy mode display LED 145 is caused to ignite for canceling the book copy mode (step S802), book copy mode selection display LED 145 is caused to extinguish (step S806), and the A-page copy signal and B-page copy signal are both set to "0" (steps S807; S808), and the process will be advanced to step S809.

When switch 309 is OFF to show that ADF 300 is opened, the process will be returned without making a change of mode.

On the contrary, if ADF 300 is in usable state (step S809) and a document has been set in position on the tray (step S810), the book copy mode operation must be inhibited. For this purpose, book copy mode selection display LED 145 is caused to extinguish (step S811), and the A-page and B-page copy signals are both caused to "0" (steps S812 and S813).

As may be well understood from the foregoing description, not only document sensing sensor 311 is provided, but also provision is made of an ADF-open/closure state sensor switch 309 in the present invention, representing such unique merit that even if a document has been set on the tray of ADF 300, the book copy mode operation can be made upon the opening manipulation of ADF 300 and without giving no demerits. Therefore, a smoother and more convenient copier machine operation can be realized without removing a document left on the tray each time when the book copy mode is scheduled and realized and therefore, either ADF-operation or book copy operation can be selectively and distinctly brought about. This means a remarkable progress in the art.

What is claimed is:

1. An electrostatic copying machine comprising:
   means for designating a book copy mode;
   means for executing the book copy mode by successive scannings with use of an optical system wherein a first half of a document to be copied is scanned and then a latter half;
   means for automatically feeding a document onto a transparent plate for positioning said document thereon;
   means for sensing an operable condition of said automatic feeding means; and
   a book copy control means, responsive to said sensing means, for releasing the book copy mode having been designated by said designating means when a condition of said automatic document feeding means is changed into the operable condition.

2. An electrostatic copying machine comprising:
   means for designating a book copy mode;
   means for executing the book mode by successive scannings with use of an optical system wherein a first half of a document to be copied is scanned and then a latter half;
   a manual copy paper supply means for manually feeding desired size of copy paper;
   means for sensing an operable condition of said manual copy paper supply means; and
   a book copy control means, responsive to said sensing means, for releasing the book copy mode having been designated by said designating means when a condition of said manual copy paper supply means is changed into the operable condition.

3. An electrostatic copying machine comprising:
   means for designating a book copy mode;
   means for executing the book mode by successive scannings with use of an optical system wherein a first half of a document to be copied is scanned and then a latter half;
   a manual copy paper supply means for manually feeding desired size of copy paper;
   means for sensing an operable condition of said manual copy paper supply means;
   means for automatically feeding a document onto a transparent plate for positioning said document thereon;
   means for sensing an operable condition of said automatic document feeding means; and
   a book copy control menas, responsive to each sensing means, for releasing the book copy mode having been designated by said designating means when a condition of either said manual copy paper supply means or said automatic document feeding means is changed into the operable condition.

4. An electrostatic copying machine as claimed in claim 1, wherein said book copy control means further inhibits to designate the book copy mode by said designating means when said sensing menas is in operation.

5. An electrostatic copying machine as claimed in claim 2, wherein said book copy control means further inhibits to designate the book copy mode by said designating means when said sensing means is in operation.

6. An electrostatic copying machine comprising:
   feeding means for feeding copy paper, one by one;
   image forming means for forming an image of an original document on the copy paper fed by said feeding means;
   a manual copy paper supply means for manually feeding a desired size of copy paper;
   first mode designating means for designating a first copy mode;
   second mode designating means for designating a second copy mode different from said first copy mode;
   detecting means for detecting when said manual feeding means is to be used; and
   control means, when said manual copy paper supply means is detected to be used by said detecting means, to automatically change over to said first copy mode if said second copy mode has been designated.

7. An electrostatic copying machine as claimed in claim 6 wherein the entire area of the document is copied on a single surface of copy paper in said first copy mode.

8. An electrostatic copying machine as claimed in claim 6 wherein the halves of the document are copied respectively on different surfaces of a copy paper in said second copy mode.

9. An electrostatic copying machine comprising:
   feeding means for feeding copy paper, one by one;
   image forming means for forming an image of an original document on the copy paper fed by said feeding means, said image forming means includes means for scanning the original document;
   means for automatically feeding the document onto a transparent plate for positioning said document thereon;
   first mode designating means for designating a first scanning mode;
   second mode designating means for designating a second scanning mode different from said first scanning mode;
   detecting means for detecting when said automatic document feeding means is to be used; and
   control means, when said automatic document feeding means is detected to be used by said detecting means, to automatically change over to said first scanning mode if said second scanning mode has already been designated.

10. An electrostatic copying machine as claimed in claim 9 wherein the entire area of the document is copied on a single surface of copy paper in said first scanning mode.

11. An electrostatic copying machine as claimed in claim 9 wherein the halves of the document are copied respectively on different surfaces of copy paper in said second scanning mode.

12. An electrostatic copying machine comprising:
feeding means for feeding copy paper, one by one;
image forming means for forming an image of an original document on the copy paper fed by said feeding means, said image forming means includes means for scanning the original document;
means for automatically feeding the document onto a transparent plate for positioning said document thereon;
first mode designating means for designating a first scanning mode;
second mode designating means for designating a second scanning mode different from said first scanning mode;
detecting means for detecting when said automatic document feeding means is to be used; and
control means, when said automatic document feeding means is detected to be used by said detecting means, to inhibit designation of said second scanning mode.

13. An electrostatic copying machine as claimed in claim 12 wherein the entire area of the document is copied on a single surface of copy paper in said first scanning mode.

14. An electrostatic copying machine as claimed in claim 12 wherein the halves of the document are copied respectively on different surfaces of copy paper in said second scanning mode.

* * * * *